United States Patent
Yamaguchi

(10) Patent No.: US 11,456,673 B2
(45) Date of Patent: Sep. 27, 2022

(54) POWER CONVERSION DEVICE OF A NEUTRAL POINT CLAMP TYPE

(71) Applicant: TOSHIBA MITSUBISHI-ELECTRIC INDUSTRIAL SYSTEMS CORPORATION, Chuo-ku (JP)

(72) Inventor: Haruyuki Yamaguchi, Tokyo (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 104 days.

(21) Appl. No.: 16/640,080

(22) PCT Filed: Aug. 31, 2017

(86) PCT No.: PCT/JP2017/031422
§ 371 (c)(1),
(2) Date: Feb. 19, 2020

(87) PCT Pub. No.: WO2019/043886
PCT Pub. Date: Mar. 7, 2019

(65) Prior Publication Data
US 2020/0204082 A1    Jun. 25, 2020

(51) Int. Cl.
*H02M 7/487* (2007.01)
*H02M 5/458* (2006.01)
*H02P 27/06* (2006.01)

(52) U.S. Cl.
CPC ......... *H02M 5/4585* (2013.01); *H02M 7/487* (2013.01); *H02P 27/06* (2013.01)

(58) Field of Classification Search
CPC ............ H02M 1/00; H02M 1/08; H02M 1/12; H02M 1/32; H02M 7/12; H02M 7/122;
(Continued)

(56) References Cited

U.S. PATENT DOCUMENTS 5,953,222 A * 9/1999 Mizutani ............ H03K 17/567
  363/56.05
10,199,953 B2 * 2/2019 Kadota ................ H02M 7/003
(Continued)

FOREIGN PATENT DOCUMENTS

JP    2001-61280 A    3/2001
JP    2003-70262 A    3/2003
(Continued)

OTHER PUBLICATIONS

International Search Report dated Sep. 26, 2017 in PCT/JP2017/031422 filed on Aug. 31, 2017, citing documents AP-AR therein, 1 page.

*Primary Examiner* — Thienvu V Tran
*Assistant Examiner* — Nusrat Quddus
(74) *Attorney, Agent, or Firm* — Oblon, McClelland, Maier & Neustadt, L.L.P.

(57) ABSTRACT

A power conversion device includes first to fourth switching elements, and first to eighth diodes. The first to fourth diodes are electrically connected in inverse parallel to the first to fourth switching elements, respectively. The seventh diode is electrically connected in parallel to the second diode. The eighth diode is electrically connected in parallel to the third diode. The second diode is housed in a first package. The seventh diode is housed in a second package, which is different from the first package, and which does not include the switching elements. The eighth diode is housed in the second package, or alternatively, the eighth diode is housed in another package, which is different from the first package and the second package, and which does not include the switching elements.

9 Claims, 17 Drawing Sheets

(58) Field of Classification Search
CPC ...... H02M 7/483; H02M 7/487; H02M 7/493; H02M 7/537; H02M 7/5387; H02M 7/53875; H02M 7/797; H02M 5/4585; H02P 27/06; H02J 3/386; G05F 1/67
USPC .............................. 363/56, 58, 132, 136, 137
See application file for complete search history.

(56) References Cited

U.S. PATENT DOCUMENTS

| | | | | |
|---|---|---|---|---|
| 10,840,818 B2* | 11/2020 | Lu | ......................... | H02M 7/537 |
| 2004/0267468 A1* | 12/2004 | Leuthen | ................ | H02M 7/483 |
| | | | | 702/64 |
| 2006/0274561 A1* | 12/2006 | Ahmed | ................ | H02M 7/003 |
| | | | | 361/699 |
| 2010/0328833 A1* | 12/2010 | Frisch | .................. | H01L 25/072 |
| | | | | 361/111 |
| 2012/0281442 A1* | 11/2012 | Revelant | ............... | H02M 7/487 |
| | | | | 363/40 |
| 2013/0194840 A1* | 8/2013 | Huselstein | ........... | H02H 7/1206 |
| | | | | 363/50 |
| 2015/0270786 A1* | 9/2015 | Chen | ..................... | H02M 7/003 |
| | | | | 363/131 |
| 2017/0047863 A1* | 2/2017 | Kidera | .................. | H02M 7/483 |
| 2018/0233918 A1* | 8/2018 | Nishida | ................. | H02M 7/493 |
| 2018/0278175 A1* | 9/2018 | Korhonen | ............... | H02P 27/14 |
| 2018/0309380 A1* | 10/2018 | Flora | ...................... | H02M 7/487 |
| 2020/0350830 A1* | 11/2020 | Hano | ....................... | H01G 4/38 |
| 2021/0083597 A1* | 3/2021 | Hayashi | ................ | H02M 7/487 |
| 2021/0218326 A1* | 7/2021 | Kaneko | ................. | H02M 7/003 |

FOREIGN PATENT DOCUMENTS

| | | | | |
|---|---|---|---|---|
| JP | 2005-160248 | * | 6/2005 | |
| JP | 2005-168240 A | | 6/2005 | |
| JP | 2013-236460 A | | 11/2013 | |
| JP | 2016-100988 | * | 11/2014 | |
| JP | 2016-187277 | * | 3/2015 | |
| WO | WO-2014082221 A | * | 6/2014 | ........... H02M 7/487 |
| WO | WO-2020106324 A1 | * | 5/2020 | .......... H02M 1/4216 |

\* cited by examiner

POWER CONVERSION DEVICE OF A NEUTRAL POINT CLAMP TYPE

TECHNICAL FIELD

Embodiments of the present invention relate to a power conversion device.

BACKGROUND ART

A neutral point clamped (NPC) type three-level converter is known as one of power conversion devices which convert AC power into DC power. Some NPC type three-level converters have four semiconductor modules electrically connected in series and two clamp diodes as one leg. Each of the four semiconductor modules includes a switching element and a diode electrically connected in inverse parallel to the switching element.

However, in the NPC type three-level converter as described above, among the four semiconductor modules electrically connected in series, a temperature rise in the two semiconductor modules located inside may be high.

CITATION LIST

Patent Literature

[Patent Literature 1;]
Japanese Unexamined Patent Application, First Publication No. 2003-70262

SUMMARY OF INVENTION

Technical Problem

An object of the present invention is to provide a power conversion device capable of curbing temperature rise in a semiconductor module.

Solution to Problem

A power conversion device of an embodiment is a neutral point clamp type power conversion device and includes first to fourth switching elements and first to eighth diodes. The first to fourth switching elements are electrically connected to each other in series in an order of the first switching element, the second switching element, the third switching element, and the fourth switching element from a positive electrode toward a negative electrode. The first to fourth diodes are electrically connected in inverse parallel to the first to fourth switching elements, respectively. In the fifth diode, a cathode is electrically connected to a first connection portion which electrically connects the first switching element to the second switching element, and an anode is electrically connected to a neutral point of the power conversion device. In the sixth diode, an anode is electrically connected to a second connection portion which electrically connects the third switching element to the fourth switching element and a cathode is electrically connected to the neutral point. The seventh diode is electrically connected in parallel to the second diode. The eighth diode is electrically connected in parallel to the third diode. The second diode is accommodated in a first package. The seventh diode is accommodated in a second package which is different from the first package and does not include the switching elements. The eighth diode is accommodated in the second package, or the eighth diode is accommodated in another package which is different from the first package and the second package and does not include the switching elements.

DESCRIPTION OF EMBODIMENTS

Figure 1:
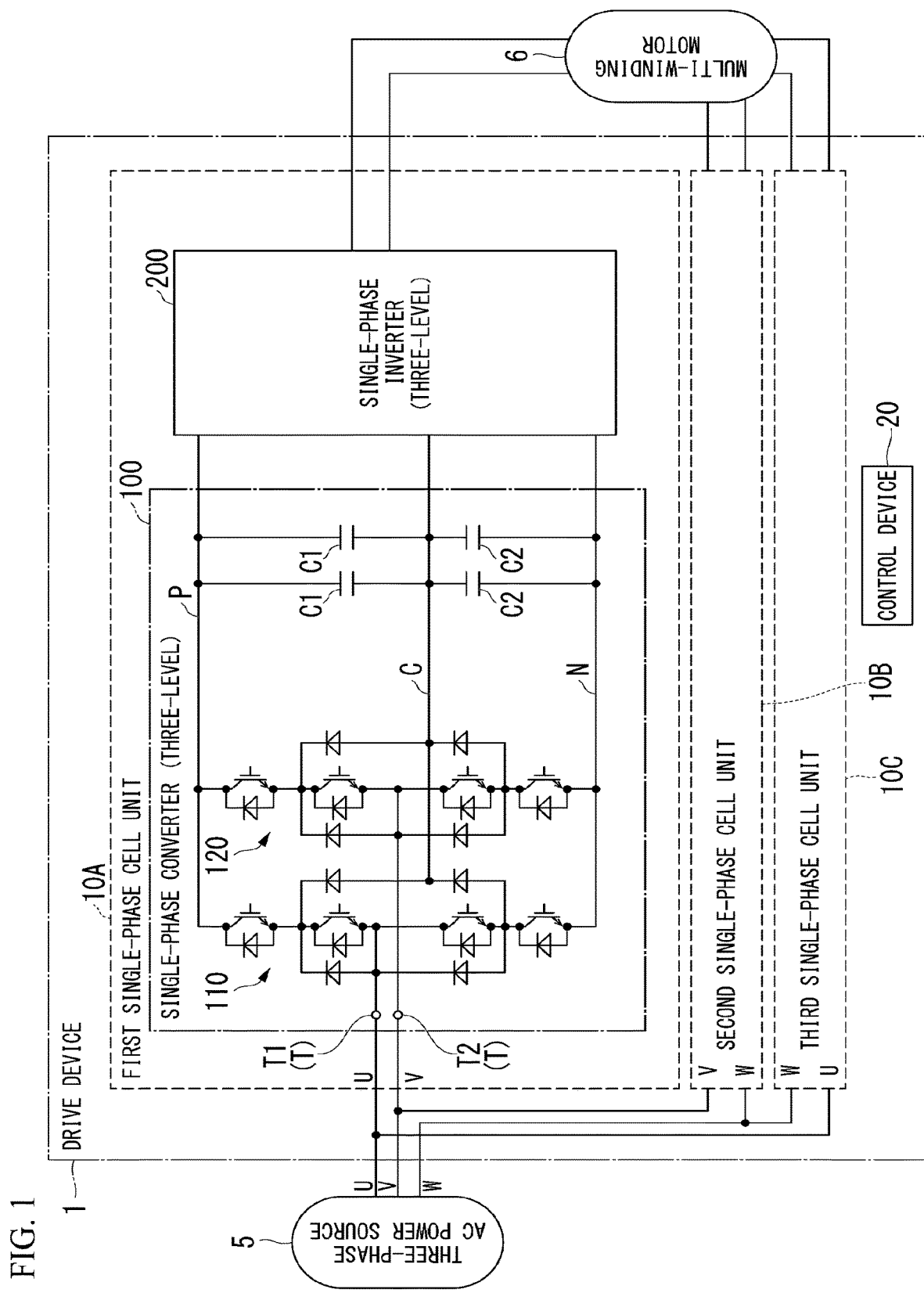
FIG. 1 is a diagram showing an example of a drive device according to a first embodiment.

Hereinafter, a power conversion device and a drive device of an embodiment are described with reference to drawings.

In the following description, constituents having the same or similar functions are designated by the same reference numerals. Additionally, duplicated description of such constituents is omitted. In the drawings referred to below, illustration of a gate wiring for control, or the like will be omitted for convenience of explanation.

First Embodiment

A converter 100 and a drive device 1 according to a first embodiment will be described with reference to FIGS. 1 to 11. In the embodiment, an example in which the drive device 1 is constituted of a plurality of single-phase cell units will be described. The drive device 1 may be constituted of a three-phase converter and a three-phase inverter as will be described later.

FIG. 1 is a diagram showing an example of a drive device (a motor drive device) 1 according to the first embodiment. As shown in FIG. 1, in the drive device 1 of the embodiment, the primary side is electrically connected to a three-phase AC power source 5, and the secondary side is electrically connected to a three-phase multi-winding motor 6. The drive device 1 includes, for example, first to third single-phase cell units 10A, 10B, and 10C and a control device 20 which controls the single-phase cell units 10A, 10B, and 10C.

More specifically, a first phase and a second phase (a U-phase and a V-phase in the drawing) of the three-phase AC power source 5 are input to the first single-phase cell unit 10A An output of the first single-phase cell unit 10A is input to a first phase of the multi-winding motor 6. The second phase and a third phase (the V-phase and a W-phase in the drawing) of the three-phase AC power source 5 are input to the second single-phase cell unit 10B. An output of the second single-phase cell unit 10B is input to a second phase of the multi-winding motor 6. The third phase and the first phase (the W-phase and the U-phase in the drawing) of the three-phase AC power source 5 are input to the third single-phase cell unit 10C. An output of the third single-phase cell unit 10C is input to a third phase of the multi-winding motor 6. Also, the three-phase AC power source 5 includes an inductance component as an internal impedance.

Next, an internal constitution of each of the single-phase cell units 10A, 10B, and 10C will be described. Here, the first to third single-phase cell units 10A, 10B, and 10C have substantially the same constitution and function. Thus, hereinafter, the first single-phase cell unit 10A will be described on behalf of them. As shown in FIG. 1, the first single-phase cell unit 10A includes a single-phase three-level converter 100 and a single-phase three-level inverter 200.

The three-level converter 100 (hereinafter, simply referred to as "converter 100") is an NPC type three-level converter and is an example of the "power conversion device". The converter 100 is electrically connected to a power line for two phases of the three-phase AC power source 5 and converts AC power supplied from the three-phase AC power source 5 into DC power. The converter 100 is a converter in which a switching element is controlled by, for example, pulse width modulation (PWM). The converter 100 will be described later in detail.

The three-level inverter 200 (hereinafter, simply referred to as "inverter 200") is electrically connected to, for example, a winding for one phase of the multi-winding motor 6. The multi-winding motor 6 is an example of a "load". The inverter 200 converts the DC power converted and output by the converter 100 into AC power having an arbitrary frequency and voltage for controlling a torque and speed of the multi-winding motor 6. The inverter 200 supplies the converted AC power to the multi-winding motor 6. Thus, the multi-winding motor 6 is driven. Here, the three-phase multi-winding motor 6 is exemplified as the multi-winding motor.

The control device 20 controls the converter 100 and the inverter 200 of each of the single-phase cell units 10A, 10B, and 10C. For example, the control device 20 controls the converter 100 by transmitting a control signal to the switching element included in the converter 100 based on information indicating a phase voltage of the three-phase AC power source 5 detected by a voltage detector (not shown). Also, some or all of functions of the control device 20 may be provided in each of the single-phase cell units 10A, 10B, and 10C.

Hereinafter, the converter 100 will be described in detail. First, a circuit constitution of the converter 100 will be described, and then a physical constitution (an arrangement layout of respective modules, or the like) of the converter 100 will be described.

As shown in FIG. 1, the converter 100 includes, for example, two AC terminals (a first AC terminal T1, a second AC terminal T2), two legs (a first leg 110, a second leg 120), at least one (for example, a plurality of) first capacitor C1, and at least one (for example, a plurality of) second capacitor C2. Here, for convenience of explanation, the first and second AC terminals T1 and T2 and the first and second capacitors C1 and C2 will be described first, and then the first and second legs 110 and 120 will be described in detail.

Each of the first and second AC terminals T1 and T2 is a terminal provided in the converter 100 and is a terminal electrically connected to the three-phase AC power source 5 located outside the converter 100. The first AC terminal T1 of the first single-phase cell unit 10A is electrically connected to the first phase of the three-phase AC power source 5. The second AC terminal T2 of the first single-phase cell unit 10A is electrically connected to the second phase of the three-phase AC power source 5. The AC power is supplied from the three-phase AC power source 5 to the first and second AC terminals T1 and T2. In the complementary description of the second and third single-phase cell units 10B and 10C, the first AC terminal T1 of the second single-phase cell unit 10B is electrically connected to the second phase of the three-phase AC power source 5. The second AC terminal T2 of the second single-phase cell unit 10B is electrically connected to the third phase of the three-phase AC power source 5. The first AC terminal T1 of the third single-phase cell unit 10C is electrically connected to the third phase of the three-phase AC power source 5. The second AC terminal T2 of the third single-phase cell unit 10C is electrically connected to the first phase of the three-phase AC power source 5. Here, the first AC terminal T1 and the second AC terminal T2 have substantially the same constitution and function. Therefore, hereinafter, each of the first AC terminal T1 and the second AC terminal T2 is simply referred to as "AC terminal T".

A first capacitor C1 is electrically connected between a positive electrode P and a neutral point C. On the other hand, a second capacitor C2 is electrically connected between a negative electrode N and the neutral point C The first and second capacitors C1 and C2 smooth a voltage of the DC power output from the first and second legs 110 and 120. Here, the "positive electrode P" broadly means a portion which reaches a positive potential when the converter 100 is operated and may be referred to as a "positive potential portion." The "negative electrode N" broadly means a portion which reaches a negative potential when the converter 100 is operated and may be referred to as a "negative potential portion." The "neutral point C" broadly means a portion which reaches an intermediate potential (a neutral point potential) between the positive electrode P and the negative electrode N when the converter 100 is operated and may be referred to as a "neutral point potential portion."

Next, the first and second legs 110 and 120 will be described. Here, the first leg 110 and the second leg 120 have substantially the same constitution and function. Therefore, hereinafter, the first leg 110 will be described representatively.

Figure 2:
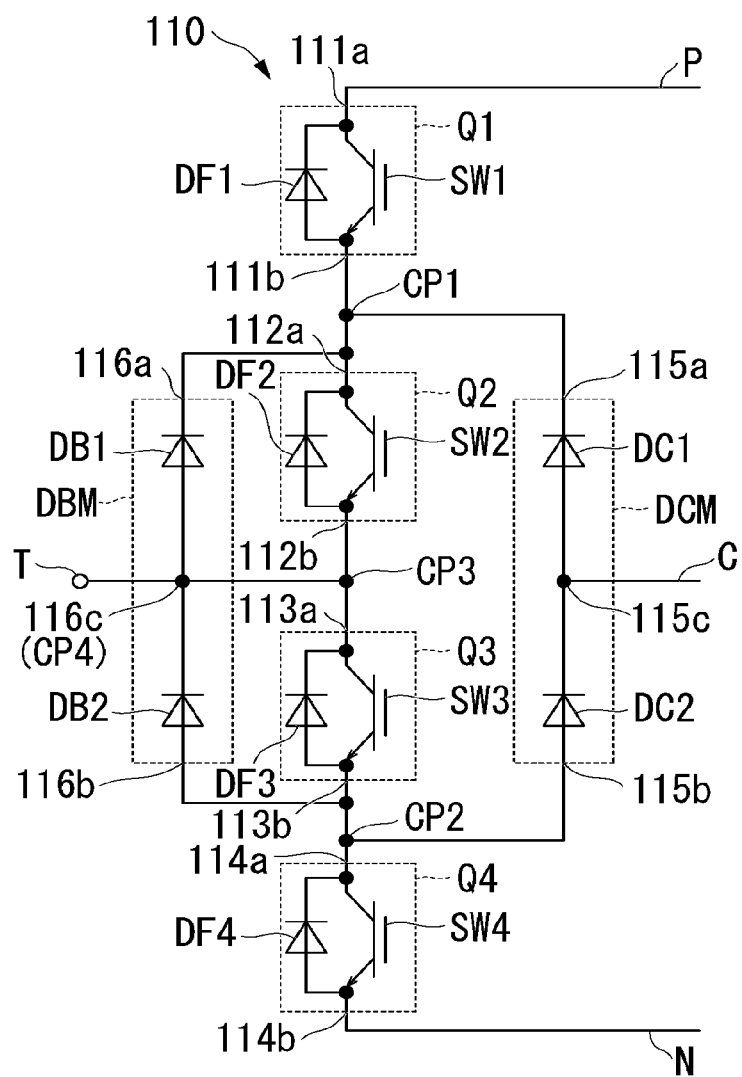
FIG. 2 is a diagram showing a first leg of the first embodiment.

FIG. 2 is a diagram showing the first leg 110. As shown in FIG. 2, the first leg 110 includes, for example, first to fourth switching elements SW1, SW2, SW3, and SW4, first to fourth free-wheeling diodes DF1, DF2, DF3, and DF4, first and second clamp diodes DC1, and DC2, and first and second shunt diodes DB1, and DB2. The first free-wheeling diode DF1 is an example of a "first diode." The second free-wheeling diode DF2 is an example of a "second diode." The third free-wheeling diode DF3 is an example of a "third diode." The fourth free-wheeling diode DF4 is an example of a "fourth diode." The first clamp diode DC1 is an example of a "fifth diode." The second clamp diode DC2 is an example of a "sixth diode." The first shunt diode DB1 is an example of a "seventh diode." The second shunt diode DB2 is an example of an "eighth diode."

First, the first to fourth switching elements SW1, SW2, SW3, and SW4 will be described. Each of the first to fourth switching elements SW1, SW2, SW3, and SW4 is, for example, a transistor type switching element having a self-extinguishing capability. Each of the first to fourth switching elements SW1, SW2, SW3, and SW4 is, for example, a bipolar transistor type switching element. In the embodiment, each of the first to fourth switching elements SW1, SW2, SW3, and SW4 is an insulated gate bipolar transistor (IGBT). However, each of the first to fourth switching elements SW1, SW2, SW3, and SW4 is not limited to the above example. The first to fourth switching elements SW1, SW2, SW3, and SW4 may be any elements as long as they can realize a three-level converter.

As shown in FIG. 2, the first to fourth switching elements SW1, SW2, SW3, and SW4 are electrically connected to each other in series in this order from the positive electrode P to the negative electrode N. In the embodiment, a collector of the first switching element SW1 is electrically connected to the positive electrode P. A collector of the second switching element SW2 is electrically connected to an emitter of the first switching element SW1. A collector of the third switching element SW3 is electrically connected to an emitter of the second switching element SW2. A collector of the fourth switching element SW4 is electrically connected to an emitter of the third switching element SW3. Additionally, an emitter of the fourth switching element SW4 is electrically connected to the negative electrode N.

In the embodiment, the AC terminal T is electrically connected to a connection portion CP3 which electrically connects the emitter of the second switching element SW2 to the collector of the third switching element SW3. Thus, the emitter of the second switching element SW2 is electrically connected to the AC terminal T via the connection portion CP3. Further, the collector of the third switching element SW3 is electrically connected to the AC terminal T via the connection portion CP3. The connection portion CP3 is an example of a "third connection portion." The connection portion CP3 is also a connection portion which electrically connects an anode of the second free-wheeling diode DF2 to a cathode of the third free-wheeling diode DF3 which will be described later.

Next, the first to fourth free-wheeling diodes DF1, DF2, DF3, and DF4 will be described. The first free-wheeling diode DF1 is electrically connected in inverse parallel to the first switching element SW1. The second free-wheeling diode DF2 is electrically connected in inverse parallel to the second switching element SW2. The third free-wheeling diode DF3 is electrically connected in inverse parallel to the third switching element SW3. The fourth free-wheeling diode DF4 is electrically connected in inverse parallel to the fourth switching element SW4. "Connected in inverse parallel" means that the switching element and the free-wheeling diode are electrically connected in parallel and also means that a direction in which a current flows in the forward direction in the switching element is opposite to a direction in which the current flows in the forward direction in the free-wheeling diode.

In the embodiment, a continuous maximum allowable current capacity (a rated current) (hereinafter, simply referred to as "current capacity") of each of the first to fourth free-wheeling diodes DF1, DF2, DF3, and DF4 is substantially the same as a current capacity of each of the first to fourth switching elements SW1, SW2, SW3, and SW4. The current capacity of each of the first to fourth free-wheeling diodes DF1, DF2, DF3, and DF4 is not limited to the above example as long as it is equal to or greater than a predetermined value.

Next, the first and second clamp diodes DC1 and DC2 will be described. An anode of the first clamp diode DC1 is electrically connected to the neutral point C. A cathode of the first clamp diode DC1 is electrically connected to a connection portion CP1 which electrically connects the emitter of the first switching element SW1 to the collector of the second switching element SW2. The connection portion CP1 is an example of a "first connection portion."

On the other hand, an anode of the second clamp diode DC2 is electrically connected to a connection portion CP2 which electrically connects the emitter of the third switching element SW3 to the collector of the fourth switching element SW4. The connection portion CP2 is an example of a "second connection portion." A cathode of the second clamp diode DC2 is electrically connected to the neutral point C.

Next, the first and second shunt diodes DB1 and DB2 will be described. The first shunt diode DB1 is electrically connected in parallel to the second free-wheeling diode DF2. The first shunt diode DB1 is one free-wheeling diode and performs substantially the same function as that of the second free-wheeling diode DF2. The first shunt diode DB1 is a diode which causes a current to be divided and then flow to the first shunt diode DB1 and the second free-wheeling diode DF2 when the current flows from the AC terminal T toward the positive electrode P. In other words, the first shunt diode DB1 is a diode which causes some of the current flowing from the AC terminal T toward the positive electrode P to bypass and not pass through the second free-wheeling diode DF2.

For example, the first shunt diode DB1 has substantially the same characteristics related to a forward voltage drop ($V_F$) as those of the second free-wheeling diode DF2. "Characteristics related to the forward voltage drop are substantially the same" means, for example, that a relationship between a forward voltage value and a forward current value ($V_F$-$I_F$ characteristics) is substantially the same. "Characteristics related to the forward voltage drop are substantially the same" may mean, for example, that a threshold value of the forward voltage value at which a forward current starts to flow is substantially the same.

For example, when the characteristics related to the forward voltage drop of the first shunt diode DB1 and the second free-wheeling diode DF2 are substantially the same, the current from the AC terminal T toward the positive electrode P is easily substantially equally divided with respect to the first shunt diode DB1 and the second free-wheeling diode DF2. Further, when at least one of generations and lot numbers of the first shunt diode DB1 and the second free-wheeling diode DF2 are the same, the current from the AC terminal T toward the positive electrode P is easily substantially more equally divided with respect to the first shunt diode DB1 and the second free-wheeling diode DF2. Even when the first shunt diode DB1 and the second free-wheeling diode DF2 have different generations and lot numbers, those having substantially the same characteristics related to the forward voltage drop may be extracted by sorting.

However, the first diode DB1 is not limited to one having substantially the same characteristics related to the forward voltage drop as those of the second free-wheeling diode DF2. That is, a ratio of the currents after division with respect to the first shunt diode DB1 and the second free-wheeling diode DF2 may not be substantially equal. For example, the current flowing through the first shunt diode DB1 may be larger or smaller than that flowing through the second free-wheeling diode DF2. At least some of the current flowing from the AC terminal T toward the positive electrode P may flow to the first shunt diode DB1.

The second shunt diode DB2 is electrically connected in parallel to the third free-wheeling diode DF3. The second shunt diode DB2 is one free-wheeling diode and performs substantially the same function as that of the third free-wheeling diode DF3. The second shunt diode DB2 is a diode which causes a current to be divided and then flow to the second shunt diode DB2 and the third free-wheeling diode DF3 when the current flows from the negative electrode N toward the AC terminal T. In other words, the second shunt diode DB2 is a diode which bypasses some of the current flowing from the negative electrode N toward the AC terminal T not to pass through the third free-wheeling diode DF3.

For example, the second shunt diode DB2 has substantially the same characteristics related to the forward voltage drop as those of the third free-wheeling diode DF3. When the characteristics related to the forward voltage drop of the second shunt diode DB2 and the third free-wheeling diode DF3 are substantially the same, the current from the negative electrode N toward the AC terminal T is easily substantially equally divided with respect to the second shunt diode DB2 and the third free-wheeling diode DF3. Further, when at least one of generations and lot numbers of the second shunt diode DB2 and the third free-wheeling diode DF3 is the same, the current from the negative electrode N toward the AC terminal T is easily substantially more equally divided with respect to the second shunt diode DB2 and the third free-wheeling diode DF3. Even when the second shunt diode DB2 and the third free-wheeling diode DF3 have different generations and lot numbers, those having substantially the same characteristics related to the forward voltage drop may be extracted by sorting.

However, the second shunt diode DB2 is not limited to the one having substantially the same characteristics related to the forward voltage drop as those of the third free-wheeling diode DF3. That is, a ratio of the currents after division with respect to the second shunt diode DB2 and the third free-wheeling diode DF3 may not be substantially equal. For example, the current flowing through the second shunt diode DB2 may be larger or smaller than that flowing through the third free-wheeling diode DF3. At least some of the current flowing from the negative electrode N toward the AC terminal T may flow to the second shunt diode DB2.

In the embodiment, the first shunt diode DB1 and the second shunt diode DB2 are electrically connected to each other through a connection portion CP4. The connection portion CP4 is electrically connected to the AC terminal T. In other words, the first shunt diode DB1 and the second shunt diode DB2 are electrically connected to the AC terminal T without passing through the connection portion CP3 which electrically connects the second switching element SW2 to the third switching element SW3. The connection portion CP4 is an example of a "fourth connection portion."

Next, a portion related to FIG. 2 in the physical constitution of the converter 100 will be described first. The converter 100 of the embodiment includes a first outer element module Q1, a first inner element module Q2, a second inner element module Q3, a second outer element module Q4, a clamp diode module DCM, and a shunt diode module DBM as the constitution of the first leg 110. These names are only used for convenience of explanation. That is, the terms "outer" and "inner" do not specify a physical position.

The first outer element module Q1 is a semiconductor module (a module type semiconductor) in which the first switching element SW1 and the first free-wheeling diode DF1 are built. The first outer element module Q1 has two terminals 111a and 111b. The terminal 111a is electrically connected to the collector of the first switching element SW1 and the cathode of the first free-wheeling diode DF1 inside the first outer element module Q1. The terminal 111b is electrically connected to the emitter of the first switching element SW1 and the anode of the first free-wheeling diode DF1 inside the first outer element module Q1.

The first inner element module Q2 is a semiconductor module (a module type semiconductor) in which the second switching element SW2 and the second free-wheeling diode DF2 are built. The first inner element module Q2 has two terminals 112a and 112b. The terminal 112a is electrically connected to the collector of the second switching element SW2 and the cathode of the second free-wheeling diode DF2 inside the first inner element module Q2. The terminal 112b is electrically connected to the emitter of the second switching element SW2 and the anode of the second free-wheeling diode DF2 inside the first inner element module Q2.

The second inner element module Q3 is a semiconductor module (a module type semiconductor) in which the third switching element SW3 and the third free-wheeling diode DF3 are built. The second inner element module Q3 has two terminals 113a and 113b. The terminal 113a is electrically connected to the collector of the third switching element SW3 and the cathode of the third free-wheeling diode DF3 inside the second inner element module Q3. The terminal 113b is electrically connected to the emitter of the third switching element SW3 and the anode of the third free-wheeling diode DF3 inside the second inner element module Q3.

The second outer element module Q4 is a semiconductor module (a module type semiconductor) in which the fourth switching element SW4 and the fourth free-wheeling diode DF4 are built. The second outer element module Q4 has two terminals 114a and 114b. The terminal 114a is electrically connected to the collector of the fourth switching element SW4 and the cathode of the fourth free-wheeling diode DF4 inside the second outer element module Q4. The terminal 114*b* is electrically connected to the emitter of the fourth switching element SW4 and the anode of the fourth free-wheeling diode DF4 inside the second outer element module Q4.

The clamp diode module DCM is a semiconductor module (a module type semiconductor) in which the first and second clamp diodes DC1 and DC2 are built. The clamp diode module DCM has terminals 115*a*, 115*b*, and 115*c*. The terminal 115*a* is electrically connected to the cathode of the first clamp diode DC1 inside the clamp diode module DCM. The terminal 115*b* is electrically connected to the anode of the second clamp diode DC2 inside the clamp diode module DCM. The terminal 115*c* is electrically connected to the anode of the first clamp diode DC1 and the cathode of the second clamp diode DC2 inside the clamp diode module DCM.

The shunt diode module DBM is a semiconductor module (a module type semiconductor) in which the first and second shunt diodes DB1 and DB2 are built. The shunt diode module DBM has three terminals 116*a*, 116*b*, and 116*c*. The terminal 116*a* is electrically connected to the cathode of the first shunt diode DB1 inside the shunt diode module DBM. The terminal 116*b* is electrically connected to the anode of the second shunt diode DB2 inside the shunt diode module DBM. The terminal 116*c* is electrically connected to the anode of the first shunt diode DB1 and the cathode of the second shunt diode DB2 inside the shunt diode module DBM. An electrical connection portion between the anode of the first shunt diode DB1 and the cathode of the second shunt diode DB2 provided in the shunt diode module DBM corresponds to the above-described connection portion CP4.

Next, an operation mode of the converter 100 having such a constitution will be described. Since the operation mode of the converter 100 as the three-level converter is the same as that of the conventional three-level converter, the detailed description thereof will be omitted. Here, four operation modes related to the first and second shunt diodes DB1 and DB2 will be described.

Figure 3:
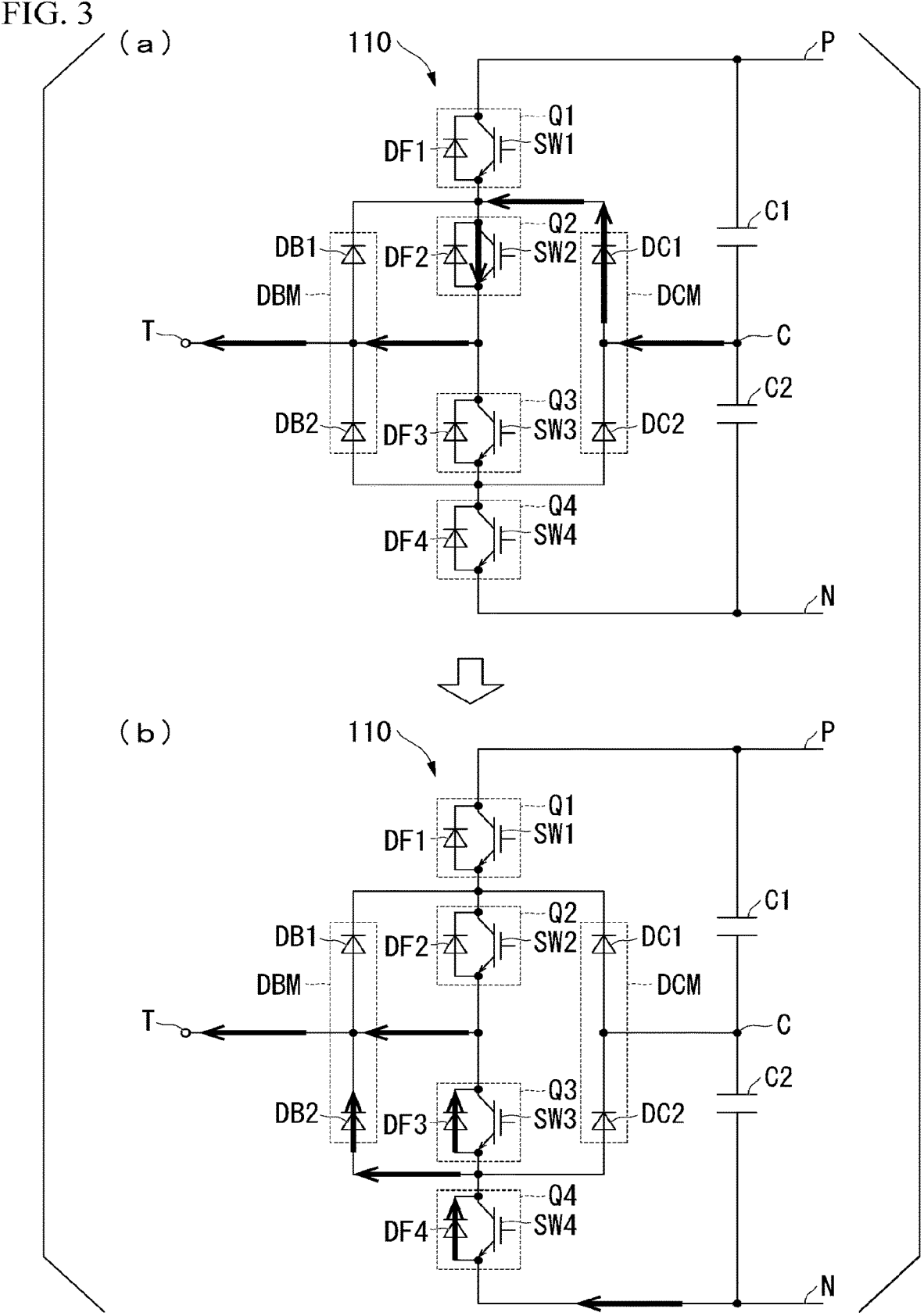
FIG. 3 is a diagram showing operation modes before and after a second switching element is turned off in a half cycle period of a fundamental wave in which the first leg outputs a negative voltage according to the first embodiment.

FIG. 3 is a diagram showing each of the operation modes before and after the second switching element SW2 is turned off in a half cycle period of a fundamental wave in which the first leg 110 outputs a negative voltage. In general, since the single-phase converter 100 is operated in the vicinity of a power factor of 1, a current flows from first leg 110 to the three-phase AC power source 5 via the AC terminal T during this period.

(a) in FIG. 3 shows an operation mode before the second switching element SW2 is turned off. In this operation mode, the first and fourth switching elements SW1 and SW4 are in an OFF state, and the second switching element SW2 is in an ON state. In this case, the current flows from the neutral point C to the AC terminal T through the first clamp diode DC1 and the second switching element SW2. At this time, a gate signal is generally given to the third switching element SW3 as well, but the gate signal is not necessarily given.

(b) in FIG. 3 shows an operation mode after the second switching element SW2 is turned off from the state of (a) in FIG. 3. In this operation mode, the first and second switching elements SW1 and SW2 are in the OFF state.

At this time, the gate signal is generally given to the third and fourth switching elements SW3 and SW4. However, as will be described below, even when the third and fourth switching elements SW3 and SW4 are in the ON state, the current does not flow through the third and fourth switching elements SW3 and SW4. That is, in this case, the current continuously flows from the first leg 110 to the three-phase AC power source 5 via the AC terminal T due to the internal inductance component of the three-phase AC power source 5. Therefore, the current flows from the negative electrode N toward the fourth free-wheeling diode DF4, passes through the fourth free-wheeling diode DF4 and then is divided with respect to flow into the third free-wheeling diode DF3 and the second shunt diode DB2. The currents which have passed through the third free-wheeling diode DF3 and the second shunt diode DB2 join again and flow to the AC terminal T.

Figure 4:
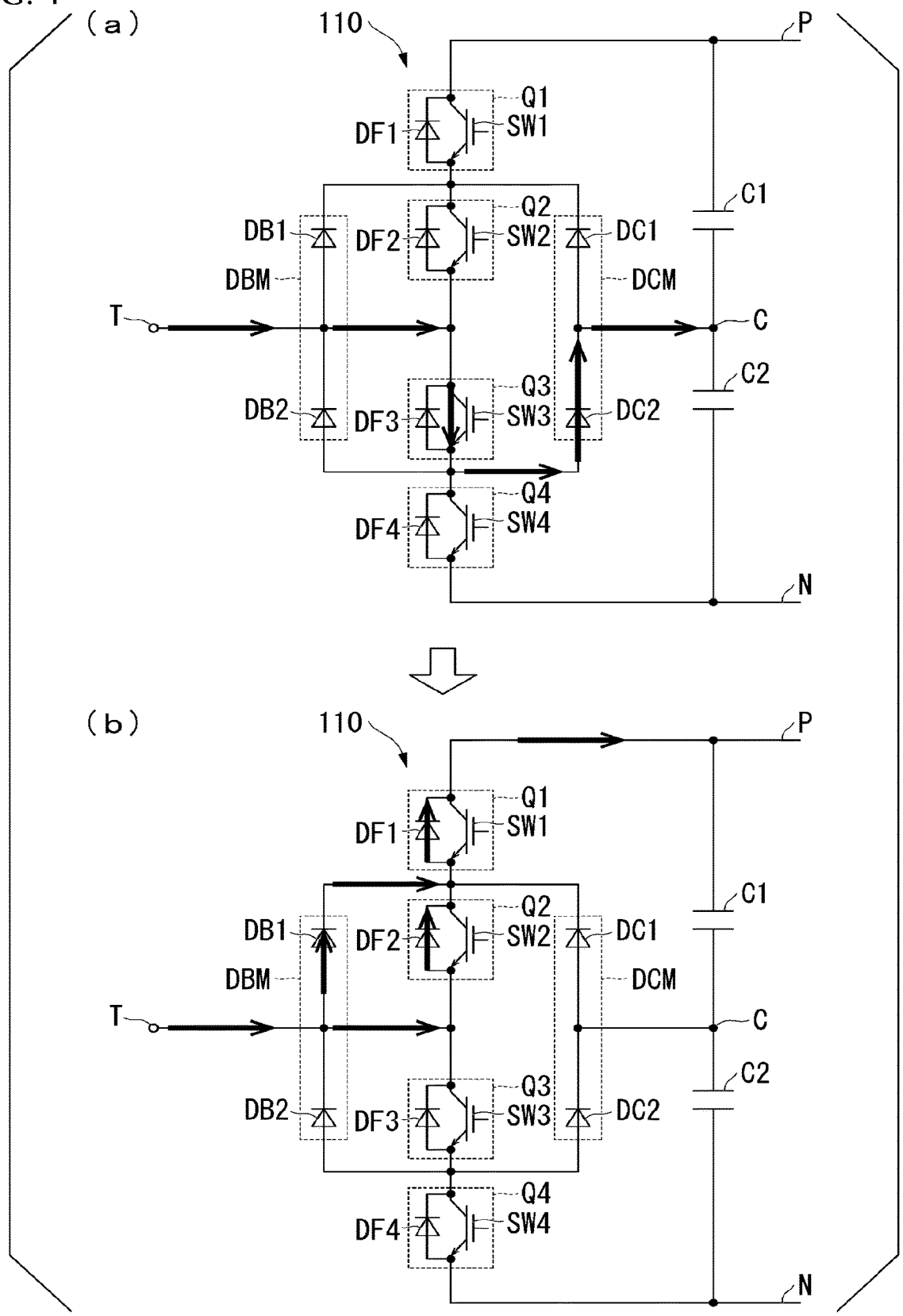
FIG. 4 is a diagram showing operation modes before and after a third switching element is turned off in the half cycle period of the fundamental wave in which the first leg outputs a positive voltage according to the first embodiment.

FIG. 4 is a diagram showing each of the operation modes before and after the third switching element SW3 is turned off in the half cycle period of the fundamental wave in which the first leg 110 outputs a positive voltage. As described above, since the single-phase converter 100 is generally operated in the vicinity of a power factor of 1, the current flows from the three-phase AC power source 5 to the first leg 110 via the AC terminal T during this period.

(a) in FIG. 4 shows an operation mode before the third switching element SW3 is turned off. In this operation mode, the first and fourth switching elements SW1 and SW4 are in the OFF state, and the third switching element SW3 is in the ON state. In this case, the current flows from the AC terminal T to the neutral point C through the third switching element SW3 and the second clamp diode DC2. At this time, generally, the gate signal is given to the second switching element SW2 as well, but the gate signal may not necessarily be given.

(b) in FIG. 4 shows an operation mode after the third switching element SW3 is turned off from the state of (a) in FIG. 4. In this operation mode, the third and fourth switching elements SW3 and SW4 are in the OFF state.

At this time, the gate signal is generally given to the first and second switching elements SW1 and SW2. However, as will be described below, even when the first and second switching elements SW1 and SW2 are in the ON state, the current does not flow through the first and second switching elements SW1 and SW2. That is, in this case, the current continuously flows from the three-phase AC power source 5 to the first leg 110 via the AC terminal T due to the internal inductance component of the three-phase AC power source 5. Therefore, the current is divided to flow from the AC terminal T to the second free-wheeling diode DF2 and the first shunt diode DB1. The currents which have passed through the second free-wheeling diode DF2 and the first shunt diode DB1 join again, passes through the first free-wheeling diode DF1 and flows to the positive electrode P.

Here, in the embodiment, a current path in (a) in FIG. 3 and a current path in (a) in FIG. 4 are referred to as "cutoff paths". The "cutoff path" is a current path which is cut off when the second switching element SW2 or the third switching element SW3 is turned off. On the other hand, a current path in (b) in FIG. 3 and a current path in (b) in FIG. 4 are referred to as "free-wheeling paths". The "free-wheeling path" is a current path through which a current flows when the second switching element SW2 or the third switching element SW3 is turned off. The "cutoff path" and "free-wheeling path" will be described again in the description of the physical constitution of the converter 100.

Figure 5:
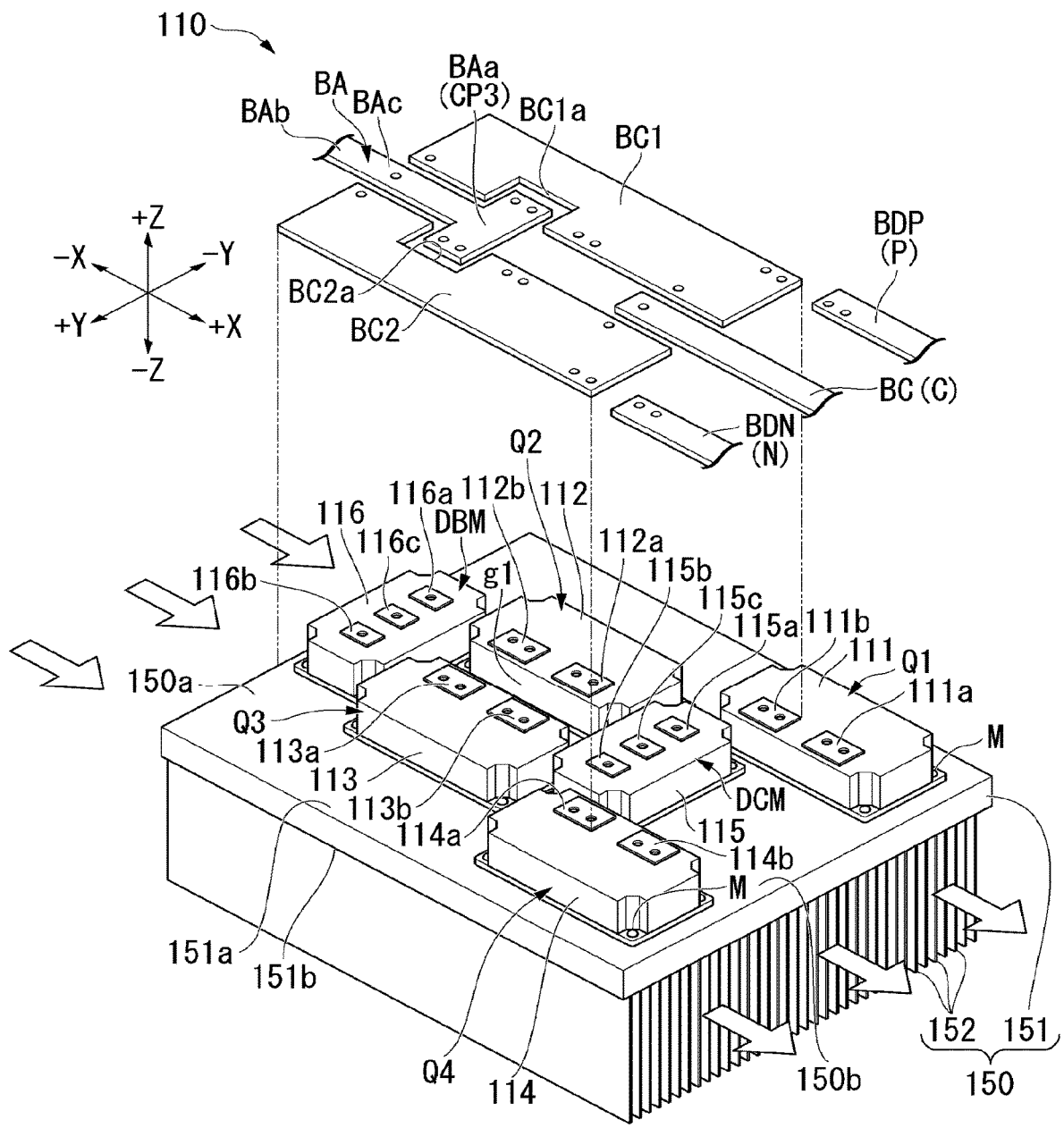
FIG. 5 is a perspective view showing a physical constitution corresponding to one leg of a converter according to the first embodiment.
Figure 6:
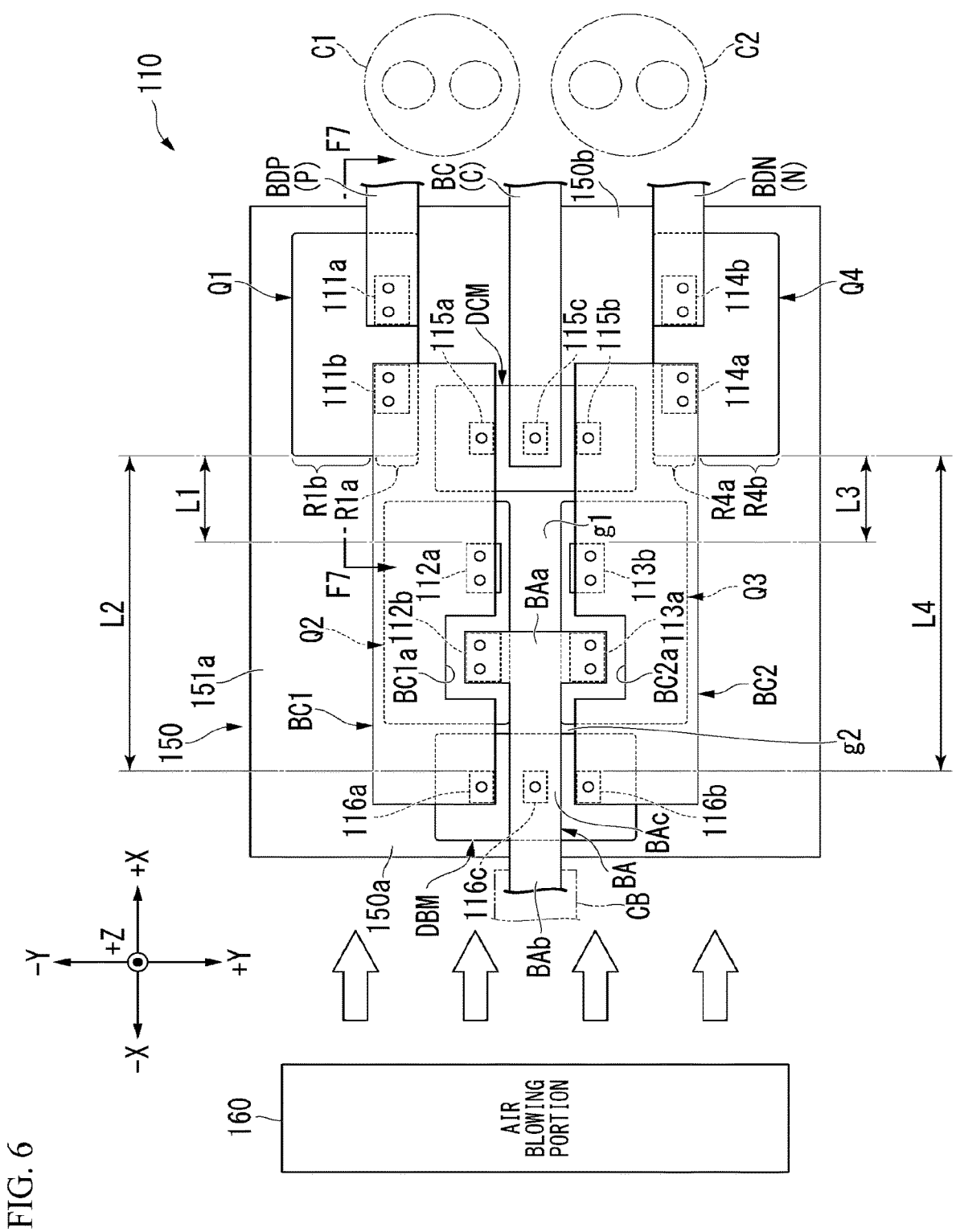
FIG. 6 is a plan view showing the physical constitution corresponding to one leg of the converter according to the first embodiment.

Next, the physical constitution of the converter 100 will be described. FIG. 5 is a perspective view showing a physical constitution corresponding to the first leg 110 of the converter 100. FIG. 6 is a plan view showing the physical constitution. Here, the +X direction, −X direction, +Y direction, −Y direction, +Z direction, and −Z direction are defined. As shown in FIG. 5, the +X direction, the −X direction, the +Y direction, and the −Y direction are directions along a first surface 151a of a heat sink 150 which will be described later. The +X direction is a direction from a first end portion 150a of the heat sink 150 toward a second end portion 150b thereof (that is, a wind flow direction). The −X direction is opposite to the +X direction. When the +X direction and the −X direction are not distinguished, they are simply referred to as "X direction". The +Y direction and the −Y direction are directions different from (for example, substantially orthogonal to) the X direction. The +Y direction is the right side along the +X direction. The −Y direction is the opposite direction to the +Y direction. When the +Y direction and the −Y direction are not distinguished, they are simply referred to as "Y direction". The +Z direction and the −Z direction are different from (for example, substantially orthogonal to) the X direction and the Y direction. The +Z direction is a direction of a mounting surface on which the semiconductor module is mounted with reference to a base 151 of the heat sink 150 which will be described later. The −Z direction is a direction of a fin 152 of the heat sink 150, which will be described later, with reference to the base 151 of the heat sink 150. The −Z direction is opposite to the +Z direction. When the +Z direction and the −Z direction are not distinguished, they are simply referred to as "Z direction".

As shown in FIGS. 5 and 6, the converter 100 includes the first outer element module Q1, the first inner element module Q2, the second inner element module Q3, the second outer element module Q4, the clamp diode module DCM, the shunt diode module DBM, the heat sink 150, an air blowing portion 160 (refer to FIG. 6), an AC bus BA, a DC positive electrode bus BDP, a DC negative electrode bus BDN, a neutral point bus BC, a first connection bus BC1, and a second connection bus BC2 as constitutions corresponding to the first leg 110. Each of the buses BA, BDP, BDN, BC, BC1, and BC2 will be described after an arrangement layout of each of the modules Q1, Q2, Q3, Q4, DCM, and DBM is described.

As described above, the first outer element module Q1 includes the first switching element SW1 and the first free-wheeling diode DF1 which are built therein. That is, the first outer element module Q1 includes the first switching element SW1, the first free-wheeling diode DF1, and a package (an outer member) 111 which accommodates the first switching element SW1 and the first free-wheeling diode DF1. The package 111 has an insertion hole through which a fixing member M such as a screw is passed. The package 111 is fixed to the heat sink 150 by the fixing member M which has passed through the insertion hole. The constitution of the package 111 will be described later in detail with reference to FIG. 8. Packages 112, 113, 114, 115, and 116 of the modules Q2, Q3, Q4, DCM, and DBM which will be described below have substantially the same constitution as that of the package 111 which will be described later.

The above-described two terminals 111a and 111b are provided on a surface of the package 111. The two terminals 111a and 111b are arranged in the +X direction in the order of the terminal 111b and the terminal 111a. For example, the first outer element module Q1 is formed in a rectangular parallelepiped shape having a longitudinal direction in a direction (the X direction) in which the two terminals 111a and 111b are arranged. Further, the terminals 111a and 111b are disposed to be biased toward the +Y direction side with respect to a center portion of the first outer element module Q1 in the Y direction.

As described above, the first inner element module Q2 includes the second switching element SW2 and the second free-wheeling diode DF2 which are built therein. That is, the first inner element module Q2 includes the second switching element SW2, the second free-wheeling diode DF2, and the package (the outer member) 112 which accommodates the second switching element SW2 and the second free-wheeling diode DF2. The package 112 is an example of the "first package." The package 112 has an insertion hole through which the fixing member M such as a screw is passed. The package 112 is fixed to the heat sink 150 by the fixing member M which has passed through the insertion hole.

The above-described two terminals 112a and 112b are provided on a surface of the package 112. The two terminals 112a and 112b are arranged in the +X direction in the order of the terminal 112b and the terminal 112a. For example, the first inner element module Q2 is formed in a rectangular parallelepiped shape having a longitudinal direction in a direction (the X direction) in which the two terminals 112a and 112b are arranged. Further, the terminals 112a and 112b are disposed to be biased toward the +Y direction side with respect to a center portion of the first inner element module Q2 in the Y direction.

As described above, the second inner element module Q3 includes the third switching element SW3 and the third free-wheeling diode DF3 which are built therein. That is, the second inner element module Q3 includes the third switching element SW3, the third free-wheeling diode DF3, and the package (the outer member) 113 which accommodates the third switching element SW3 and the third free-wheeling diode DF3. The package 113 has an insertion hole through which the fixing member M such as a screw is passed. The package 113 is fixed to the heat sink 150 by the fixing member M which has passed through the insertion hole.

The above-described two terminals 113a and 113b are provided on a surface of the package 113. The two terminals 113a and 113b are arranged in the +X direction in the order of the terminal 113a and the terminal 113b. For example, the second inner element module Q3 is formed in a rectangular parallelepiped shape having a longitudinal direction in a direction (the X direction) in which the two terminals 113a and 113b are arranged. Further, the terminals 113a and 113b are disposed to be biased toward the −Y direction side with respect to a center portion of the second inner element module Q3 in the Y direction.

As described above, the second outer element module Q4 includes the fourth switching element SW4 and the fourth free-wheeling diode DF4 which are built therein. That is, the second outer element module Q4 includes the fourth switching element SW4, the fourth free-wheeling diode DF4, and the package (the outer member) 114 which accommodates the fourth switching element SW4 and the fourth free-wheeling diode DF4. The package 114 has an insertion hole through which the fixing member M such as a screw is passed. The package 114 is fixed to the heat sink 150 by the fixing member M which has passed through the insertion hole.

The above-described two terminals 114a and 114b are provided on a surface of the package 114. The two terminals 114a and 114b are arranged in the +X direction in the order of the terminal 114a and the terminal 114b. For example, the second outer element module Q4 is formed in a rectangular parallelepiped shape having a longitudinal direction in a direction (the X direction) in which the two terminals 114a and 114b are arranged. Further, the terminals 114a and 114b are disposed to be biased toward the −Y direction side with respect to a center portion of the second outer element module Q4 in the Y direction.

As described above, the clamp diode module DCM includes the first and second clamp diodes DC1 and DC2 which are built therein. That is, the clamp diode module DCM includes the first and second clamp diodes DC1 and DC2, and the package (the outer member) 115 which accommodates the first and second clamp diodes DC1 and DC2. The clamp diode module DCM does not include the switching elements. That is, the switching elements are not accommodated in the package 115. The package 115 is an example of the "third package". The package 115 has an insertion hole through which the fixing member M such as a screw is passed. The package 115 is fixed to the heat sink 150 by the fixing member M which has passed through the insertion hole.

The above-described three terminals 115a, 115b, and 115c are provided on a surface of the package 115. The three terminals 115a, 115b, and 115c are arranged in the +Y direction in the order of the terminal 115a, the terminal 115c, and the terminal 113b. For example, the clamp diode module DCM is formed in a rectangular parallelepiped shape having a longitudinal direction in a direction (the Y direction) in which the three terminals 115a, 115b, and 115c are arranged. The terminals 115a, 115b, and 115c are disposed at a substantially center portion of the clamp diode module DCM in the X direction.

As described above, the shunt diode module DBM includes the first and second shunt diodes DB1 and DB2 which are built therein. That is, the shunt diode module DBM includes the first and second shunt diodes DB1 and DB2, and the package (the outer member) 116 which accommodates the first and second shunt diodes DB1 and DB2. The shunt diode module DBM does not include the switching elements. That is, the switching elements are not accommodated in the package 116. The package 116 is an example of a "second package". The package 116 has an insertion hole through which the fixing member M such as a screw is passed. The package 116 is fixed to the heat sink 150 by the fixing member M which has passed through the insertion hole.

The above-described three terminals 116a, 116b, and 116c are provided on a surface of the package 116. The three terminals 116a, 116b, and 116c are arranged in the +Y direction in the order of the terminal 116a, the terminal 116c, and the terminal 116b. For example, the shunt diode module DBM is formed in a rectangular parallelepiped shape having a longitudinal direction in a direction (the Y direction) in which the three terminals 116a, 116b, and 116c are arranged. The terminals 116a, 116b, and 116c are disposed at a substantially center portion of the shunt diode module DBM in the X direction.

In the embodiment, the first shunt diode DB1 is disposed farther away from the second switching element SW2 than the second free-wheeling diode DF2. The second shunt diode DB2 is disposed farther away from the third switching element SW3 than the third free-wheeling diode DF3.

The heat sink 150 includes the base 151 and a plurality of fins 152 provided on the base 151. The base 151 is formed in a plate shape. The base 151 has a first surface 151a and a second surface 151b located on the side opposite to the first surface 151a. The first surface 151a is formed in a planar shape, for example. The first surface 151a is a mounting surface on which the above-described six modules Q1, Q2, Q3, Q4, DCM, and DBM are mounted. The six modules Q1, Q2, Q3, Q4, DCM, and DBM are mounted in different regions on the first surface 151a of the heat sink 150 and thus can transfer heat to the heat sink 150 separately. In the embodiment, the six modules Q1, Q2, Q3, Q4, DCM, and DBM are in close contact with the first surface 151a The "close contact" includes a case in which a heat conductive member such as silicon grease is interposed between the modules Q1, Q2, Q3, Q4, DCM, DBM and the first surface 151a. The plurality of fins 152 are provided on the second surface 151b of the base 151. The plurality of fins 152 are provided, for example, in the substantially entire region of the second surface 151b.

The heat sink 150 has a first end portion 150a and a second end portion 150b located on the side opposite to the first end portion 150a. The first end portion 150a is an end portion which is located on the windward side from the center portion of the heat sink 150 when an air flow is given to gaps between the plurality of fins 152 of the heat sink 150 by, for example, the air blowing portion 160. On the other hand, the second end portion 150b is an end which is located on the leeward side of the center portion of the heat sink 150 when the air flow is given to the gaps between the plurality of fins 152 of the heat sink 150 by the air blowing portion 160. The second end portion 150b is located closer to the first and second capacitors C1 and C2 (refer to FIG. 6) than the first end portion 150a. For example, the second end portion 150b faces the first and second capacitors C1 and C2.

The air blowing portion 160 gives the air flow to the gaps between the plurality of fins 152 of the heat sink 150. The air blowing portion 160 is, for example, a fan or a blower. The air blowing portion 160 is located, for example, on the upstream side of the heat sink 150 in the wind flow direction and gives the air flow to the gaps between the plurality of fins 152 of the heat sink 150 by sending wind toward the heat sink 150. Alternatively, the air blowing portion 160 may be located on the downstream side of the heat sink 150 in the wind flow direction and may give the airflow to the gaps between the plurality of fins 152 of the heat sink 150 by suctioning air between the heat sink 150 and the air blowing portion 160. Further, when the drive device 1 is mounted in a traveling body such as a railway vehicle, the air blowing portion 160 may be a wind guide which guides the air flow naturally aspirated into the drive device 1 by traveling of the traveling body toward the gaps between the plurality of fins 152 of the heat sink 150.

Next, an arrangement layout of the six modules Q1, Q2, Q3, Q4, DCM, and DBM will be described.

As shown in FIG. 6, the first and second inner element modules Q2 and Q3 are disposed substantially parallel to each other in the X direction. The first and second inner element modules Q2 and Q3 are disposed so that the side on which the terminals 112a and 112b are biased with respect to the center portion of the first inner element module Q2 in the Y direction and the side on which the terminals 113a and 113b are biased with respect to the center portion of the second inner element module Q2 in the Y direction face each other. The first and second inner element modules Q2 and Q3 are disposed with a gap g1 for electrical insulation between the terminals 112a and 113b therebetween in the Y direction.

The clamp diode module DCM is disposed on the +X direction side (that is, the leeward side) of the first and second inner element modules Q2 and Q3. In other words, the clamp diode module DCM is disposed between the first and second inner element modules Q2 and Q3 and the second end portion 150b of the heat sink 150. The clamp diode module DCM is disposed closer to the first and second capacitors C1 and C2 than the first and second inner element modules Q2 and Q3.

The clamp diode module DCM faces a part of the first inner element module Q2 and a part of the second inner element module Q3 in the X direction. The terminal 115a of the clamp diode module DCM and the terminals 112a and 112b of the first inner element module Q2 are arranged in the +X direction in the order of the terminal 112b, the terminal 112a, and the terminal 115a. The terminal 115b of the clamp diode module DCM and the terminals 113a and 113b of the second inner element module Q3 are arranged in the +X direction in the order of the terminal 113a, the terminal 113b, and the terminal 115b. The terminal 115c of the clamp diode module DCM is aligned with the gap g1 between the first and second inner element modules Q2 and Q3 in the X direction.

The first and second outer element modules Q1 and Q4 are disposed on the +X direction side (that is, the leeward side) of the first and second inner element modules Q2, Q3. In other words, the first and second outer element modules Q1 and Q4 are disposed between the first and second inner element modules Q2 and Q3 and the second end portion 150b of the heat sink 150. The first and second outer element modules Q1 and Q4 are disposed closer to the first and second capacitors C1 and C2 than the first and second inner element modules Q2 and Q3.

The first and second outer element modules Q1 and Q4 are disposed substantially parallel to each other in the X direction. The first and second outer element modules Q1 and Q4 are disposed so that the side on which the terminals 111a and 111b are biased with respect to the center portion of the first outer element module Q1 in the Y direction and the side on which the terminals 114a and 114b are biased with respect to the center portion of the second outer element module Q4 in the Y direction face each other. A distance between the first and second outer element modules Q1 and Q4 is larger than that between the first and second inner element modules Q2 and Q3.

The first and second outer element modules Q1 and Q4 are separately disposed on both sides of the clamp diode module DCM in the Y direction. The first outer element module Q1 includes a first region R1a which faces the first inner element module Q2 in the −X direction, and a second region R1b which does not face the first inner element module Q2 in the −X direction. Therefore, at least some of the cooling air flowing through the gaps between the plurality of fins 152 of the heat sink 150 in the vicinity of the first outer element module Q1 is difficult to receive an aftereffect of heat from the first inner element module Q2. Thus, heat dissipation of the first outer element module Q1 can be improved. For example, in the embodiment, a width of the second region R1b in the Y direction is larger than that of the first region R1a in the Y direction. In this case, more cooling air flowing through the gaps between the plurality of fins 152 of the heat sink 150 in the vicinity of the first outer element module Q1 is difficult to receive the aftereffect of the heat from the first inner element module Q2. Accordingly, the heat dissipation of the first outer element module Q1 can be further improved.

Similarly, the second outer element module Q4 has a first region R4a which faces the second inner element module Q3 in the −X direction, and a second region R4b which does not face the second inner element module Q3 in the −X direction. Therefore, at least some of the cooling air flowing through the gaps between the plurality of fins 152 of the heat sink 150 in the vicinity of the second outer element module Q4 is difficult to receive an aftereffect of heat from the second inner element module Q3. Thus, the heat dissipation of the second outer element module Q4 can be improved. For example, in the embodiment, a width of the second region R4b in the Y direction is larger than that of the first region R4a in the Y direction. In this case, more cooling air flowing through the gaps between the plurality of fins 152 of the heat sink 150 in the vicinity of the second outer element module Q4 is difficult to receive the aftereffect of the heat from the second inner element module Q3. Accordingly, the heat dissipation of the second outer element module Q4 can be further improved.

Further, at least a part of the terminal 111b of the first outer element module Q1 is located on the −X direction side from a part of the clamp diode module DCM. Therefore, a distance between the terminal 111b of the first outer element module Q1 and the terminal 112a of the first inner element module Q2 is relatively short, and an inductance between the terminal 111b and the terminal 112a is reduced. Similarly, at least a part of the terminal 114a of the second outer element module Q4 is located on the −X direction side from a part of the clamp diode module DCM. Therefore, a distance between the terminal 114a of the second outer element module Q4 and the terminal 113b of the second inner element module Q3 is relatively short, and the inductance between the terminal 114a and the terminal 113b is reduced.

The shunt diode module DBM is disposed on the −X direction side (that is, the windward side) of the first and second inner element modules Q2 and Q3. In other words, the shunt diode module DBM is disposed between the first and second inner element modules Q2 and Q3 and the first end portion 150a of the heat sink 150. The shunt diode module DBM is disposed on the side of at least a part of each of the first and second inner element modules Q2 and Q3 opposite to the clamp diode module DCM. The shunt diode module DBM is disposed on the side of at least a part of each of the first and second inner element modules Q2 and Q3 opposite to the first and second capacitors C1 and C2.

The shunt diode module DBM faces a part of the first inner element module Q2 and a part of the second inner element module Q3 in the X direction. The terminal 116a of the shunt diode module DBM and the terminals 112a and 112b of the first inner element module Q2 are arranged in the +X direction in the order of the terminal 116a, the terminal 112b, and the terminal 112a. The terminal 116b of the shunt diode module DBM and the terminals 113a and 113b of the second inner element module Q3 are arranged in the +X direction in the order of the terminal 116b, the terminal 113a, and the terminal 113b. The terminal 116c of the shunt diode module DBM is aligned with the gap g1 between the first and second inner element modules Q2 and Q3 in the X direction.

In the embodiment, the shunt diode module DBM is disposed away from the first and second inner element modules Q2 and Q3. From an electrical point of view, the shunt diode module DBM does not have to be separated from the first and second inner element modules Q2 and Q3. The shunt diode module DBM may be in contact with the first and second inner element modules Q2 and Q3. However, in the embodiment, a gap g2 is provided between the shunt diode module DBM and the first and second inner element modules Q2 and Q3. When such a gap g2 is provided, interference between the shunt diode module DBM and the inner element modules Q2 and Q3 are curbed even when at least one of the shunt diode module DBM and the inner element modules Q2 and Q3 has a relatively large component tolerance, and it is easy to dispose the shunt diode module DBM and the inner element modules Q2 and Q3 at predetermined positions. Further, when such a gap g2 is provided, it is difficult for heat to move directly between the shunt diode module DBM and the inner element modules Q2 and Q3, and heat generated in the shunt diode module DBM and the inner element modules Q2 and Q3 is easily transferred by the heat sink 150. Therefore, the heat dissipation of the shunt diode module DBM and the inner element modules Q2 and Q3 is further enhanced.

Next, the AC bus BA, the DC positive electrode bus BDP, the DC negative electrode bus BDN, the neutral point bus BC, the first connection bus BC1, and the second connection bus BC2 will be described.

The AC bus BA electrically connects the AC terminal T, the terminal 116c of the shunt diode module DBM, and the terminals 112b and 113a of the first and second inner element modules Q2 and Q3 to each other. The AC bus BA extends from the first and second inner element modules Q2 and Q3 toward the AC terminal T or a conductor (an intermediate connection conductor) CB electrically connected to the AC terminal T in the −X direction. The −X direction side is an example of a "first side". The expression "extends from the first and second inner element modules Q2 and Q3 toward the AC terminal T or the conductor CB electrically connected to the AC terminal T in the −X direction" also includes a case in which the AC bus BA extends from the first and second inner element modules Q2 and Q3 to the first side and is then bent in another direction.

In the embodiment, the AC bus BA has a first end portion BAa, a second end portion BAb, and a shunt diode module connection portion BAc. The first end portion BAa has a width in the Y direction larger than that of each of the second end portion BAb and the shunt diode module connection portion BAc. For example, the first end portion BAa has a T-shape, a Y-shape, a trapezoidal shape, or other shapes such that the width of the first end portion BAa in the Y direction is larger than that of the shunt diode module connection portion BAc. The first end portion BAa faces the terminal 112b of the first inner element module Q2 and the terminal 113a of the second inner element module Q3 in the Z direction and is connected to the terminals 112b and 113a. The first end portion BAa forms the above-described connection portion CP3 (a connection portion which electrically connects the second switching element SW2 to the third switching element SW3). The second end portion BAb is located on the side opposite to the first end portion BAa and is connected to the AC terminal T or the conductor CB. The shunt diode module connection portion BAc is located between the first end portion BAa and the second end portion BAb. The shunt diode module connection portion BAc faces the terminal 116c of the shunt diode module DBM in the Z direction and is connected to the terminal 116c. The AC bus BA is an example of a "first conductor."

When seen from another point of view, the shunt diode module DBM is located on the input side of AC power as compared to the first and second inner element modules Q2 and Q3. Additionally, a wiring length corresponding to a length of the AC bus BA between the shunt diode module connection portion BAc and the first end portion BAa is present between the shunt diode module DBM and the first and second inner element modules Q2 and Q3. In other words, the wiring length between the AC terminal T and the first and second shunt diodes DB1, DB2 is shorter than that between the AC terminal T and the second and third freewheeling diodes DF2, DF3. Effects thereof will be described later.

The DC positive electrode bus BDP faces the terminal 111a of the first outer element module Q1 in the Z direction and is connected to the terminal 111a. The DC positive electrode bus BDP extends from the first outer element module Q1 toward the +X direction side (that is, toward the first capacitor C1). The DC positive electrode bus BDP electrically connects the terminal 111a of the first outer element module Q1 to the first capacitor C1. The DC positive electrode bus BDP is an example of the "positive electrode P."

The DC negative electrode bus BDN faces the terminal 114b of the second outer element module Q4 in the Z direction and is connected to the terminal 114b. The DC negative electrode bus BDN extends from the second outer element module Q4 toward the +X direction side (that is, toward the second capacitor C2). The DC negative electrode bus BDN electrically connects the terminal 114b of the second outer element module Q4 to the second capacitor C2. The DC negative electrode bus BDN is an example of the "negative electrode N."

The neutral point bus BC faces the terminal 115c of the clamp diode module DCM in the Z direction and is connected to the terminal 115c. The neutral point bus BC extends from the clamp diode module DCM toward the +X direction side (that is, toward the first and second capacitors C1 and C2). The neutral point bus BC electrically connects the terminal 115c of the clamp diode module DCM to an electrical series connection point between the first capacitor C1 and the second capacitor C2. The neutral point bus BC is an example of the "neutral point C."

The first connection bus BC1 covers a part of each of the first inner element module Q2, the clamp diode module DCM, the first outer element module Q1, and the shunt diode module DBM. The first connection bus BC1 faces the terminal 111b of the first outer element module Q1, the terminal 112a of the first inner element module Q2, the terminal 115a of the clamp diode module DCM, and the terminal 116a of the shunt diode module DBM in the Z direction and is connected to the terminals 111b, 112a, 115a, and 116a. The first connection bus BC1 may be formed in a flat plate shape but is not limited thereto. For example, when positions of the terminals 111b, 112a, 115a, and 116a in the Z direction are different from each other, the first connection bus BC1 may have a bent structure in the Z direction corresponding to a height of each of the terminals 111b, 112a, 115a, and 116a. Further, when the positions of the terminals 111b, 112a, 115a, and 116a in the Z direction are different from each other, one or more conductor components which are respectively inserted into gaps between the first connection bus BC1 and the terminals 111b, 112a, 115a, and 116a and electrically connect the first connection bus BC1 to each of the terminals 111b, 112a, 115a, and 116 may be provided.

In the embodiment, the first connection bus BC1 has a cutout BC1a for avoiding the first end portion BAa of the AC bus BA. The first connection bus BC1 may have a bent structure in the Z direction (a three-dimensional intersection structure with respect to the first end portion BAa of the AC bus BA) for avoiding interference with the first end portion BAa of the AC bus BA, instead of the cutout BC1a. The first connection bus BC1 extends in the −X direction side beyond the first end portion BAa (that is, the connection portion between the AC bus BA and the first inner element module Q2) of the AC bus BA when seen from the first outer element module Q1. According to such a constitution, for example, when the cooling air from the air blowing portion 160 is supplied not only between the plurality of fins 152 of the heat sink 150 but also around the first connection bus BC1, a part of the first connection bus BC1 is located on the windward side from the first inner element module Q2 and may be cooled by the cooling air without receiving the aftereffect of the heat from the first inner element module Q2. The first connection bus BC1 is an example of a "second conductor."

Further, in the embodiment, a shortest distance L1 between the terminal 112a of the first inner element module Q2 and the terminal 115a of the clamp diode module DCM is longer than a shortest distance L2 between the terminal 116a of the shunt diode module DBM and the terminal 115a of the clamp diode module DCM.

The second connection bus BC2 covers a part of each of the second inner element module Q3, the clamp diode module DCM, the second outer element module Q4, and the shunt diode module DBM. The second connection bus BC2 faces the terminal 113b of the second inner element module Q3, the terminal 114a of the second outer element module Q4, the terminal 115b of the clamp diode module DCM, and the terminal 116b of the shunt diode module DBM in the Z direction and is connected to the terminals 113b, 114a, 115b, and 116b. The second connection bus BC2 may be formed in a flat plate shape but is not limited thereto. For example, when positions of the terminals 113b, 114a, 115b, and 116b in the Z direction are different from each other, the second connection bus BC2 may have a bent structure in the Z direction corresponding to a height of each of the terminal 113b, 114a, 115b, and 116b. Further, when the positions of the terminals 113b, 114a, 115b, and 116b in the Z direction are different from each other, one or more conductor components which are respectively inserted into the gaps between the second connection bus BC2 and the terminals 113b, 114a, 115b, and 116b and electrically connect the second connection bus BC2 to each of the terminals 113b, 114a, 115b, and 116b may be provided.

In the embodiment, the second connection bus BC2 has a cutout BC2a for avoiding the first end portion BAa of the AC bus BA. The second connection bus BC2 may have a bent structure in the Z direction (a three-dimensional intersection structure with respect to the first end portion BAa of the AC bus BA) for avoiding interference with the first end portion BAa of the AC bus BA, instead of the cutout BC2a. The second connection bus BC2 extends in the −X direction side beyond the first end portion BAa (that is, the connection portion between the AC bus BA and the second inner element module Q3) of the AC bus BA when seen from the second outer element module Q4. According to such a constitution, for example, when the cooling air from the air blowing portion 160 is supplied not only between the plurality of fins 152 of the heat sink 150 but also around the second connection bus BC2, a part of the second connection bus BC2 is located on the windward side from the second inner element module Q3 and may be cooled by the cooling air without receiving the aftereffect of the heat from the second inner element module Q3.

Figure 7:
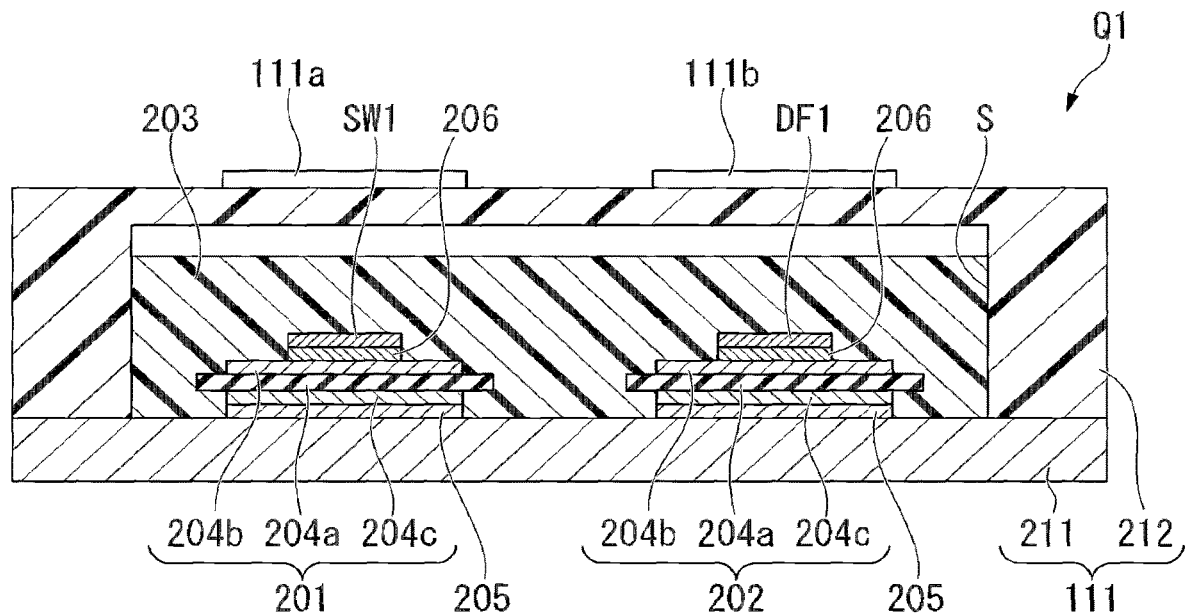
FIG. 7 is a cross-sectional view taken along line F7-F7 of a first outer element module shown in FIG. 6.

FIG. 7 is a cross-sectional view showing an example of the internal constitution of the first outer element module Q1 on behalf of the above-described six modules Q1, Q2, Q3, Q4, DCM, and DBM. Also, FIG. 7 is a cross-sectional view taken along line F7-F7 shown in FIG. 6. However, in FIG. 7, illustration of some of wiring components such as a bonding wire is omitted.

As shown in FIG. 7, the first outer element module Q1 includes the first switching element SW1, the first free-wheeling diode DF1, the package 111, a first ceramic substrate 201, a second ceramic substrate 202, and a sealing resin portion 203. The package 111 includes a base plate 211 and a cover 212. Although the base plate 211 has a flat plate shape, for example, it is not limited thereto. The cover 212 is formed in a concave shape to form an accommodation portion S which accommodates the first switching element SW1 and the first free-wheeling diode DF1 inside the package 111. The box-shaped package 111 having the accommodation portion S therein is formed by combining the base plate 211 and the cover 212. The base plate 211 is formed of a metal, is fixed to the heat sink 150 by the above-described fixing member M and is thermally connected to the heat sink 150. Thus, the first outer element module Q1 and the heat sink 150 are thermally connected well. On the other hand, the cover 212 is formed of a synthetic resin, for example.

The first and second ceramic substrates 201 and 202 are accommodated in the accommodation portion S of the package 111. Each of the first and second ceramic substrates 201 and 202 has a main body portion 204a formed of a ceramic material, and copper layers 204b and 204c respectively provided on front and back surfaces of the main body portion 204a. The first and second ceramic substrates 201 and 202 are mounted on the base plate 211 via solder portions 205 inside the package 111.

The first switching element SW1 is mounted on the first ceramic substrate 201 from the side opposite to the base plate 211. A solder portion 206 is provided between the first switching element SW1 and the first ceramic substrate 201. The first switching element SW1 is electrically connected to the terminals 111a and 111b via the bonding wire (not shown), the copper layer 204b of the first ceramic substrate 201, and an electrical connection portion (not shown) inside the package 111. Similarly, the first free-wheeling diode DF1 is mounted on the second ceramic substrate 202 from the side opposite to the base plate 211. The solder portion 206 is provided between the first free-wheeling diode DF1 and the second ceramic substrate 202. The first free-wheeling diode DF1 is electrically connected to the terminals 111a and 111b via the bonding wire (not shown), the copper layer 204b of the second ceramic substrate 202, and the electrical connection portion (not shown) inside the package 111. The sealing resin portion 203 seals the first switching element SW1, the first free-wheeling diode DF1, the first ceramic substrate 201, and the second ceramic substrate 202 inside the package 111.

Although the internal constitution of the first outer element module Q1 has been described, the internal constitutions of the other modules Q2, Q3, Q4, DCM, and DBM are substantially the same as those shown in FIG. 7. That is, each of the packages 112, 113, 114, 115, and 116 is constituted of, for example, the base 211 formed of a metal and the cover 212 formed of a synthetic resin. The internal constitutions of the modules Q1, Q2, Q3, Q4, DCM, and DBM and the constitutions of the packages 111, 112, 113, 114, 115, and 116 are not limited to the above-described example.

Figure 8:
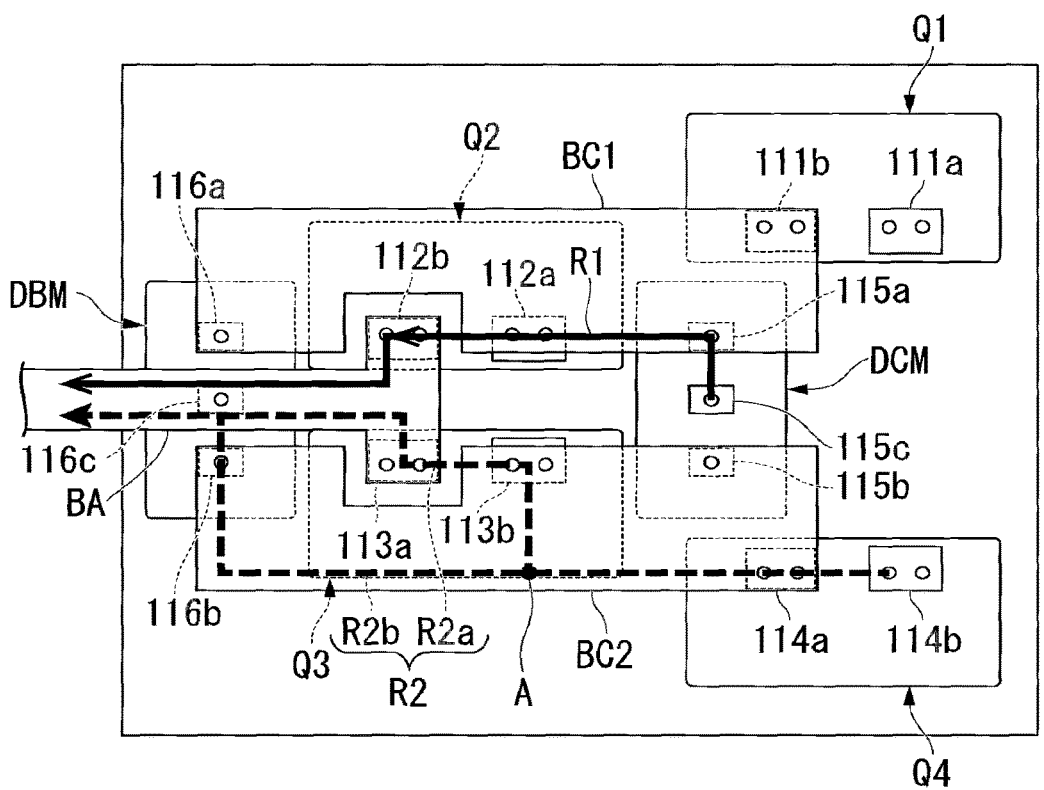
FIG. 8 is a diagram showing an example of a cutoff path and a free-wheeling path according to the first embodiment.

FIG. 8 is a diagram showing an example of the "cutoff path" and "free-wheeling path" in the above-described physical constitution. FIG. 8 shows the cutoff path R1 and the free-wheeling path R2 before and after the second switching element SW2 is turned off when the first clamp diode DC1 and the second switching element SW2 are energized. In FIG. 7, for convenience of explanation, illustration of the DC positive electrode bus BDP, the DC negative electrode bus BDN, and the neutral point bus BC is omitted.

Here, first, the free-wheeling path R2 of the embodiment will be described, and then the cutoff path R1 will be described.

As shown in FIG. 8, the free-wheeling path R2 related to the turn-off of the second switching element SW2 includes a first path R2a and a second path R2b which branch at a virtual point A. The first path R2a passes from the terminal 114b of the second outer element module Q4 to the AC bus BA through the inside of the second outer element module Q4, the terminal 114a of the second outer element module Q4, the second connection bus BC2, the terminal 113b of the second inner element module Q3, the inside of the second inner element module Q3, the terminal 113a of the second inner element module Q3 in this order. The second path R2b passes from the terminal 114b of the second outer element module Q4 to the AC bus BA through the inside of the second outer element module Q4, the terminal 114a of the second outer element module Q4, the second connection bus BC2, the terminal 116b of the shunt diode module DBM, the inside of the shunt diode module DBM, and the terminal 116c of the shunt diode module DBM in this order. According to such a constitution, since a plurality of free-wheeling paths R2a and R2b are formed electrically in parallel, the inductance of the free-wheeling path R2 is reduced as compared with a case in which the shunt diode module DBM is not present.

As shown in FIG. 8, the cutoff path R1 related to the turn-off of the second switching element SW2 passes from the terminal 115c of the clamp diode module DCM to the AC bus BA through the inside of the clamp diode module DCM, the terminal 115a of the clamp diode module DCM, the first connection bus BC1 the terminal 112a of the first inner element module Q2, the inside of the first inner element module Q2, the terminal 112b of the first inner element module Q2 in this order.

Here, in the embodiment, the clamp diode module DCM and the first inner element module Q2 are disposed next to each other, and a length of the cutoff path related to the second switching element SW2 is relatively short. Thus, according to the constitution of the embodiment, for example, as compared with a case in which the shunt diode module DBM is disposed between the first inner element module Q2 and the clamp diode module DCM (which will be described later as a second embodiment with reference to FIGS. 12 and 13), the inductance of the cutoff path R1 is reduced. The expression "the length of the cutoff path related to the second switching element SW2" is, for example, a distance between the second switching element SW2 and the neutral point C (for example, an electrical connection point between the first capacitor C1 and the second capacitor C2) and means a length of a path through which a voltage according to a current reduction rate is induced when the second switching element SW2 is turned off.

For example, in the embodiment, the shortest distance L1 between the terminal 112a of the first inner element module Q2 and the terminal 115a of the clamp diode module DCM is shorter than the shortest distance L2 between the terminal 116a of the shunt diode module DBM and the terminal 115a of the clamp diode module DCM (refer to FIG. 6). In other words, the inductance between the second switching element SW2 and the first clamp diode DC1 is smaller than that between the first shunt diode DB1 and the first clamp diode DC1. In the embodiment, since each of the module Q1, Q2, Q3, Q4, DCM, and DBM is disposed to satisfy the above-described relationship, the inductance between the first clamp diode DC1 and the second switching element SW2 is reduced, for example, as compared with a case in which the shunt diode module DBM is disposed between the first inner element module Q2 and the clamp diode module DCM (which will be described later as the second embodiment with reference to FIGS. 12 and 13). The terminal 112a of the first inner element module Q2 is an example of a "first terminal." The terminal 116a of the shunt diode module DBM is an example of a "second terminal." The terminal 115a of the clamp diode module DCM is an example of a "third terminal."

The above-described constitution is not limited to the cutoff path R1 and the free-wheeling path R2 related to the second switching element SW2, and the same applies to the cutoff path and the free-wheeling path related to the third switching element SW3. For example, in the embodiment, a shortest distance L3 between the terminal 113b of the second inner element module Q3 and the terminal 115b of the clamp diode module DCM is shorter than a shortest distance L4 between the terminal 116b of the shunt diode module DBM and the terminal 115b of the clamp diode module DCM (refer to FIG. 6). In other words, the inductance between the third switching element SW3 and the second clamp diode DC2 is smaller than that between the second shunt diode DB2 and the second clamp diode DC2. In the embodiment, since each of the module Q1, Q2, Q3, Q4, DCM, and DBM are disposed to satisfy the above-described relationship, the inductance between the second clamp diode DC2 and the third switching element SW3 is reduced, for example, as compared with a case in which the shunt diode module DBM is disposed between the second inner element module Q3 and the clamp diode module DCM (which will be described later as the second embodiment with reference to FIGS. 12 and 13), Next, an operation of the shunt diode module DBM will be described. As a premise, as described above with reference to FIGS. 3 and 4, in the three-level converter 100, when a current flows through the first outer element module Q1, a current always flows through the first inner element module Q2. On the other hand, when a current flows through the first inner element module Q2, there are a case in which a current flows through the first outer element module Q1 and a case in which a current does not flow through the first outer element module Q1 Therefore, when the first shunt diode DB1 is not provided, the loss generated in the first inner element module Q2 is larger than that generated in the first outer element module Q1, and as a result, the first inner element module Q2 generates more heat than the first outer element module Q1. In particular, when a period during which the first inner element module Q2 is energized is longer than a PWM control period, an amount of heat generated in the first inner element module Q2 is larger than that in the first outer element module Q1.

On the other hand, when the shunt diode module DBM is provided as in the embodiment, the current flowing toward the first inner element module Q2 is divided to flow into the first inner element module Q2 and the shunt diode module DBM. Thus, some of the loss (the heat generation) generated in the first inner element module Q2 when the shunt diode module DBM is not provided can be distributed to the first inner element module Q2 and the shunt diode module DBM. As a result, it is possible to curb the excessive temperature rise in a certain module as compared to the temperature rise in other modules, and the converter 100 as a whole can be operated within a predetermined temperature range. The same applies to an operation of the shunt diode DB2 with respect to the second inner element module Q3.

Figure 9:
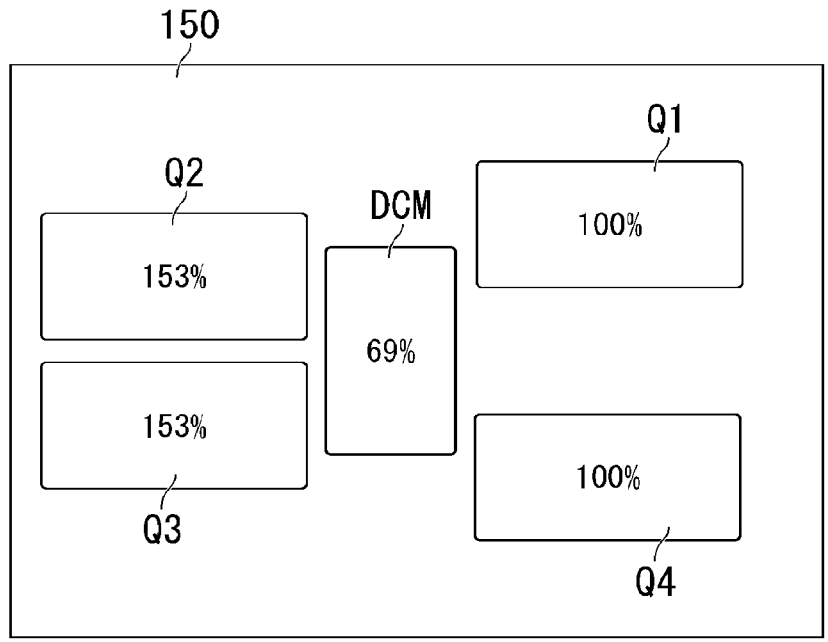
FIG. 9 is a diagram showing an example of a simulation result of an amount of heat generation of each module when a shunt diode module according to the first embodiment is not provided.
Figure 10:
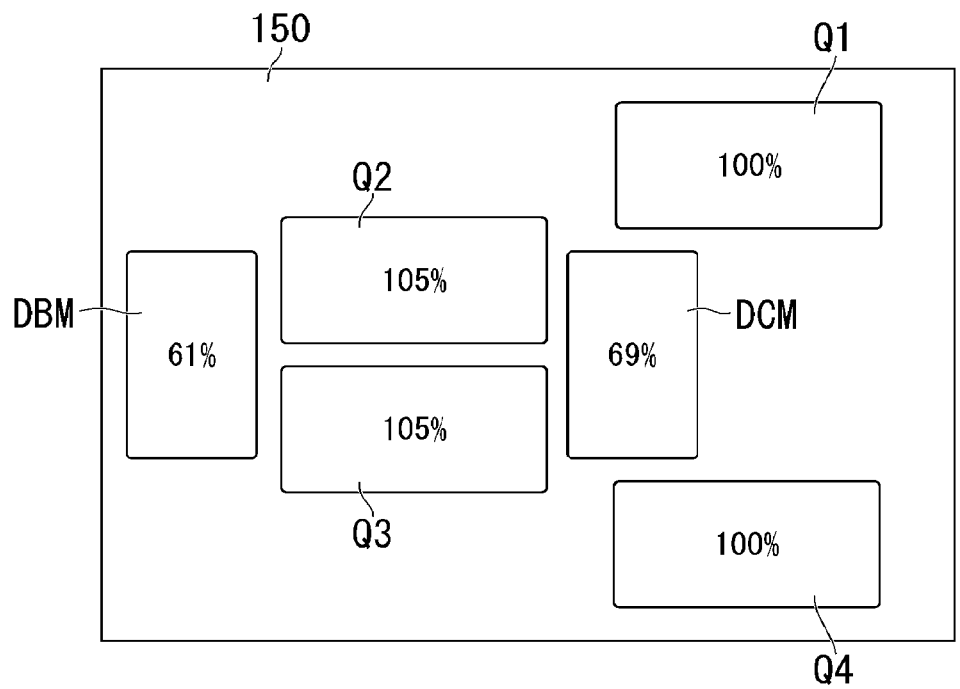
FIG. 10 is a diagram showing an example of a simulation result of the amount of heat generation of each module when the shunt diode module according to the first embodiment is provided.

FIGS. 9 and 10 show an example of a simulation result of an amount of heat generation of each of the modules Q1, Q2, Q3, Q4, DCM, and the DBM when the shunt diode module DBM is not provided (FIG. 9) and when the shunt diode module DBM is provided (FIG. 10) in a driving state of the converter with respect to the constitution of the embodiment and the same constitution as that of the embodiment except that the shunt diode module DBM is not provided. FIGS. 9 and 10 show values obtained by converting the amounts of heat generation of the other modules Q2, Q3, DCM, and DBM with the amounts of heat generation of the first and second outer element modules Q1 and Q4 being 100%. As shown in FIGS. 9 and 10, it can be understood that, when the shunt diode module DBM is provided, the heat generated in the first and second inner element modules Q2 and Q3 is reduced by about 30% as compared to the case in which the shunt diode module DBM is not provided. Due to such a reduction, the temperature rise in the first and second inner element modules Q2 and Q3 is reduced, and a margin for an allowable limit junction temperature of the element occurs accordingly.

Figure 11:
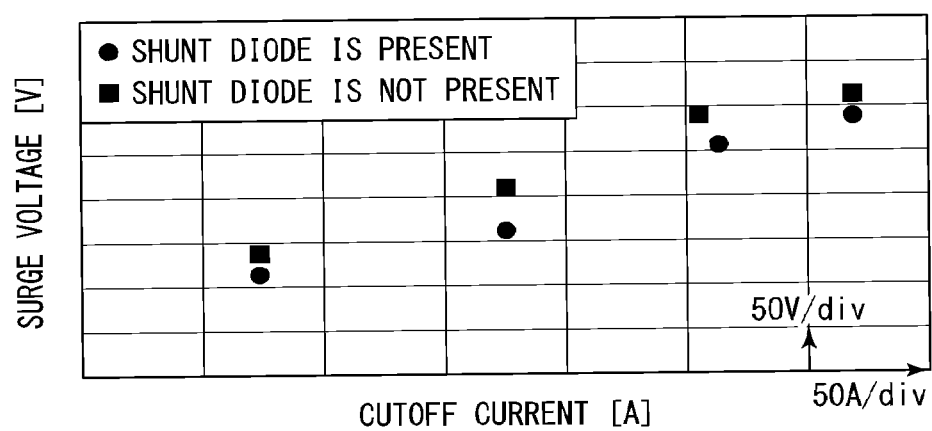
FIG. 11 is a diagram showing an example of an experimental result of a surge voltage when the shunt diode module is not provided and when the shunt diode module is provided according to the first embodiment.

FIG. 11 is a diagram showing an experimental result of a surge voltage generated in converter 100 when the shunt diode module DBM is not provided and when the shunt diode module DBM is provided. Also, FIG. 11 is a plot of the surge voltage when the current of the same value is cut off (when the second switching element SW2 or the third switching element SW3 is turned off) with respect to the constitution of the embodiment and the same constitution as that of the embodiment except that the shunt diode module DBM is not provided. In addition, the surge voltage in FIG. 11 shows only a jumping component of the voltage at the time of the cutting-off. That is, the surge voltage acting on the second switching element SW2 (or the third switching element SW3) is a value obtained by adding the plotted value and the voltage due to a DC component.

As described above, in the embodiment, the inductance of the free-wheeling path is reduced by providing the shunt diode module DBM and forming the plurality of free-wheeling paths R2a and R2b. In the embodiment, since the shunt diode module DBM is provided, the inductance of the free-wheeling path is reduced by about 10% as compared to the case in which the shunt diode module DBM is not provided. As a result, it can be confirmed that the surge voltage is reduced as shown in FIG. 11. Further, in the experiment, when the shunt diode module DBM is provided as in the embodiment, for example, in an operation mode of (b) in FIG. 4, it has been confirmed by the inventors that the current is divided to flow into the second free-wheeling diode DF2 and the first shunt diode DB1 at a ratio of about 5:4. This tendency is the same in a shunt ratio of the current flowing through the third free-wheeling diode DF3 and the second shunt diode DB2, for example, in the operation mode of (b) in FIG. 3.

According to the constitution as described above, it is possible to curb the temperature rise in the first and second inner element modules Q2 and Q3. That is, in the embodiment, the converter 100 includes the first shunt diode DB1 electrically connected in parallel to the second free-wheeling diode DF2. The second free-wheeling diode DF2 is built in the first inner element module Q2. On the other hand, the first shunt diode DB1 is different from the first inner element module Q2 and is built in the shunt diode module DBM which does not include the switching elements. According to such a constitution, the loss (the heat generation) which has occurred in the first inner element module Q2 when the shunt diode module DBM is not provided can be distributed to a plurality of modules (the first inner element module Q2 and the shunt diode module DBM). Thus, it is possible to curb the excessive temperature rise in the first inner element module Q2 as compared with the temperature rise in the first outer element module Q1. Further, according to such a constitution, since a margin for cooling occurs, the capacity of converter 100 can be increased.

In the embodiment, when the power conversion device is used as the converter 100, energy passing through the free-wheeling diodes DF1, DF2, DF3, and DF4 is larger than that passing through the switching elements SW1, SW2, SW3, and SW4. Therefore, in the embodiment, the heat generation is distributed to the plurality of modules by adding a module which does not include the switching elements rather than adding a module in which a switching element and a diode are set. According to such a constitution, the cost can be reduced and a size of the device can be reduced as compared with the case in which the module in which the switching element and the diode are set is added.

Here, in general, the characteristics related to the forward voltage drop of the diode may change under an influence of ambient temperature. Therefore, for example, when the temperature of the second free-wheeling diode DF2 and the temperature of the first shunt diode DB1 are greatly different, the second free-wheeling diode DF2 and the first shunt diode DB1 may have a difference in the characteristics related to the forward voltage drop, and the ratio of the currents after division to flow into the second free-wheeling diode DF2 and the first shunt diode DB1 may be affected. However, in the embodiment, both the first inner element module Q2 and the shunt diode module DBM are mounted on one heat sink 150. In other words, heat is transferred between the first inner element module Q2 and the shunt diode module DBM via the heat sink 150. Therefore, the great difference between the temperature of the second free-wheeling diode DF2 and the temperature of the first shunt diode DB1 is curbed, and the characteristics related to the forward voltage drop of the second free-wheeling diode DF2 and the first shunt diode DB1 are easily aligned. Accordingly, the current is easily divided substantially equally to flow into the second free-wheeling diode DF2 and the first shunt diode DB1, and the temperature rise in both the second free-wheeling diode DF2 and the first shunt diode DB1 is easily curbed.

In the embodiment, the converter 100 includes the second shunt diode DB2 electrically connected in parallel to the third free-wheeling diode DF3. The second shunt diode DB2 is built in the shunt diode module DBM together with the first shunt diode DB1. According to such a constitution, for example, the heat released from the first shunt diode DB1 is released using a relatively large module (a module having a relatively large thermal connection area with respect to the heat sink 150) in which the first and second shunt diodes DB1 and DB2 are accommodated. Thus, the temperature rise in the first shunt diode DB1 can be further curbed. The same is applied to the second shunt diode DB2.

In the embodiment, the converter 100 includes the AC bus BA which extends from the first inner element module Q2 toward the AC terminal T or the conductor CB electrically connected to the AC terminal T in the −X direction. The shunt diode module DBM is disposed on the −X direction side (that is, the input side of the AC power) with respect to the first inner element module Q2. According to such a constitution, it is easy to dispose the first inner element module Q2 and the clamp diode module DCM close to each other. In other words, it is easy to dispose the first inner element module Q2 and the first capacitor C1 close to each other. Therefore, for example, it is difficult for a length of the cutoff path with respect to the second switching element SW2 to be long, and the inductance of the cutoff path can be curbed to be relatively small. Thus, the surge voltage can be reduced. Further, according to such a constitution, the shunt diode module DBM can be disposed at a position in which it is difficult to interfere with the first and second capacitors C1 and C2. Thus, the size of the device can also be reduced.

In the embodiment, the shunt diode module DBM is disposed on the side opposite to the clamp diode module DCM with respect to at least a part of the first inner element module Q2. According to such a constitution, it is difficult for the length of the above-described cutoff path to be long, and the inductance of the cutoff path can be curbed to be relatively small. Thus, the surge voltage can be reduced.

In the embodiment, the first inner element module Q2 has the terminal 112a connected to the first connection bus BC1. The shunt diode module DBM has the terminal 116a connected to the first connection bus BC1. The clamp diode module DCM has the terminal 115a connected to the first connection bus BC1. Additionally, the shortest distance L1 between the terminal 112a of the first inner element module Q2 and the terminal 115a of the clamp diode module DCM is shorter than the shortest distance L2 between the terminal 116a of the shunt diode module DBM and the terminal 115a of the clamp diode module DCM. According to such a constitution, it is difficult for the length of the above-described cutoff path to be long, for example, as compared to the case in which the shunt diode module DBM is disposed between the second inner element module Q2 and the clamp diode module DCM (which will be described later as the second embodiment with reference to FIGS. 12 and 13), and the inductance of the cutoff path can be curbed to be relatively small. Thus, the surge voltage can be reduced.

In the embodiment, among all the modules Q1, Q2, Q3, Q4, DCM, and DBM, the shunt diode module DBM is disposed on the most windward side. According to such a constitution, in the heat sink 150, relatively cold wind (wind not heated by other modules Q1, Q2, Q3, Q4, and DCM) can be supplied in the vicinity of the shunt diode module DBM. Thus, the heat dissipation of the shunt diode module DBM can be further improved.

In the embodiment, the second free-wheeling diode DF2 and the first shunt diode DB1 have substantially the same characteristics related to the forward voltage drop. According to such a constitution, it is possible to allow the current to be divided substantially equally and to flow into the second free-wheeling diode DF2 and the first shunt diode DB1. Thus, it is possible to more effectively perform distribution of the heat in the second free-wheeling diode DF2 and the first shunt diode DB1. This is the same even when the characteristics related to the forward voltage drop in the third free-wheeling diode DF3 and the second shunt diode DB2 are substantially the same.

In the embodiment, the wiring length between the AC terminal T and the first shunt diode DB1 is shorter than that between the AC terminal T and the second free-wheeling diode DF2. Therefore, in the embodiment, when other conditions regarding the first shunt diode DB1 and the second free-wheeling diode DF2 are the same, the current flowing through the first shunt diode DB1 may be larger than the current flowing through the second free-wheeling diode DF2. Here, since the shunt diode module DBM in which the first shunt diode DB1 is built does not include the switching elements, it is difficult for the shunt diode module DBM to be hot as compared to the first inner element module Q2 in which the second free-wheeling diode DF2 and the second switching element SW2 are built. Further, from another point of view, the first shunt diode DB1 is farther away from the second switching element SW2 than the second free-wheeling diode DF2. From this point of view, it is difficult for the first shunt diode DB1 to be affected by the heat from the second switching element SW2 and is thus difficult to be hot as compared with the second free-wheeling diode DF2. Therefore, when the current flowing through the first shunt diode DB1 is substantially equal to or greater than the current flowing through the second free-wheeling diode DF2, the temperature rise can be more effectively curbed due to the distribution of the heat. Further, in the embodiment, the shunt diode module DBM is disposed on the windward side of the first inner element module Q2 and is more easily cooled than the first inner element module Q2 by the cooling air flowing through the gaps between the plurality of fins 152 of the heat sink 150. Thus, when the current flowing through the first shunt diode DB1 is substantially equal to or greater than the current flowing through the second free-wheeling diode DF2, the temperature rise can be more effectively curbed due to the distribution of the heat. The same is applied to the case in which the wiring length between the AC terminal T and the second shunt diode DB2 is shorter than that between the AC terminal T and the third free-wheeling diode DF3.

Second Embodiment

Next, a converter 100 and a drive device 1 according to a second embodiment will be described with reference to FIGS. 12 to 14. The second embodiment is different from the first embodiment in that the shunt diode module DBM is disposed between the first and second inner element modules Q2 and Q3 and the clamp diode module DCM. The constitution other than that described below is the same as that of the first embodiment.

Figure 12:
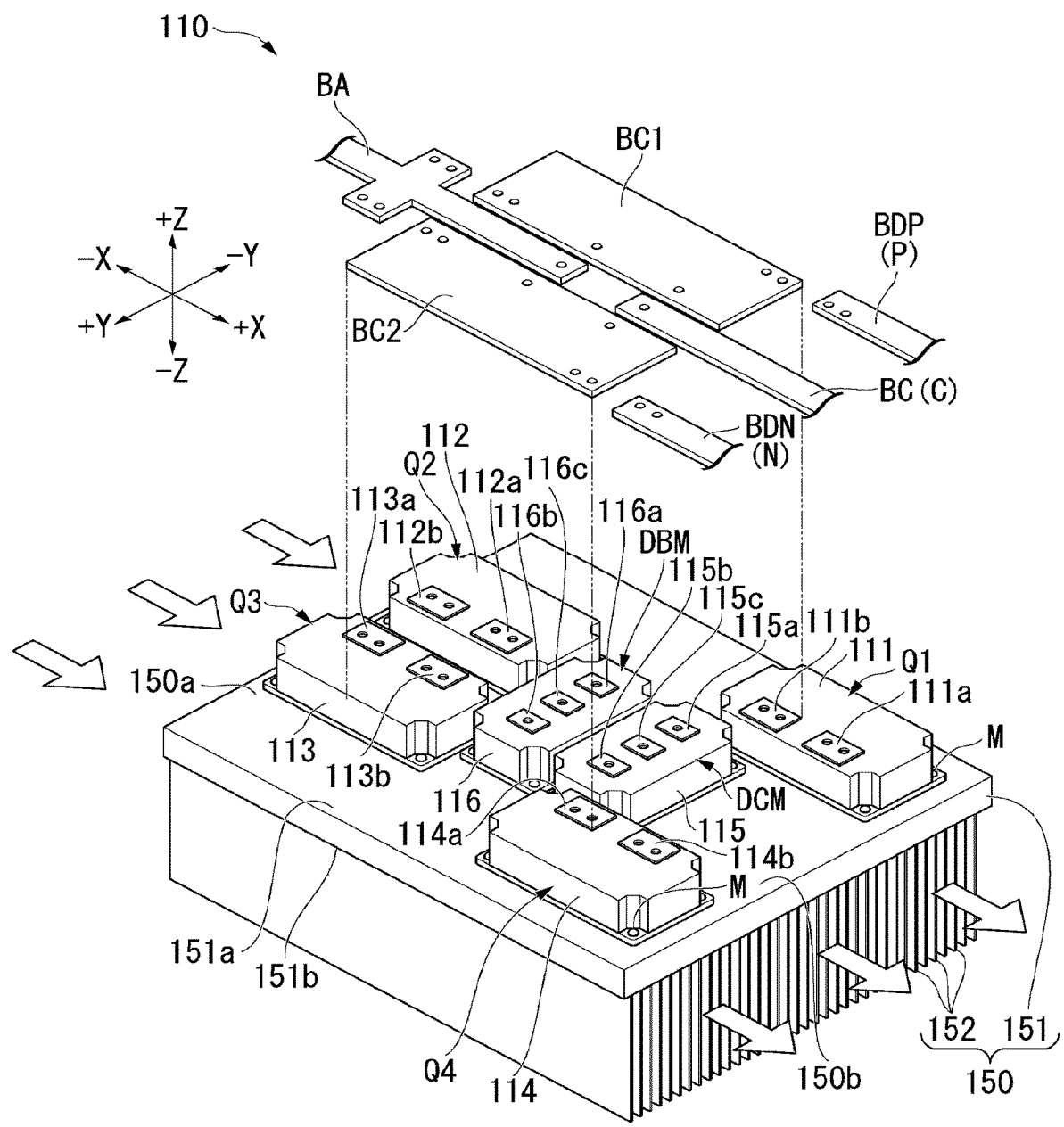
FIG. 12 is a perspective view showing a physical constitution corresponding to one leg of a converter according to a second embodiment.

FIG. 12 is a perspective view showing a physical constitution corresponding to the first leg 110 of the converter 100 of the embodiment. FIG. 13 is a plan view showing the physical constitution. As shown in FIGS. 12 and 13, in the embodiment, the shunt diode module DBM is disposed between the first and second inner element modules Q2 and Q3 and the clamp diode module DCM. Therefore, in the embodiment, the terminal 116a of the shunt diode module DBM and the terminals 112a and 112b of the first inner element module Q2 are arranged in the +X direction in the order of the terminal 112b, the terminal 112a and the terminal 116a. Similarly, the terminal 116b of the shunt diode module DBM and the terminals 113a and 113b of the second inner element module Q3 are arranged in the +X direction in the order of the terminal 113a, the terminal 113b, and the terminal 116b.

Figure 13:
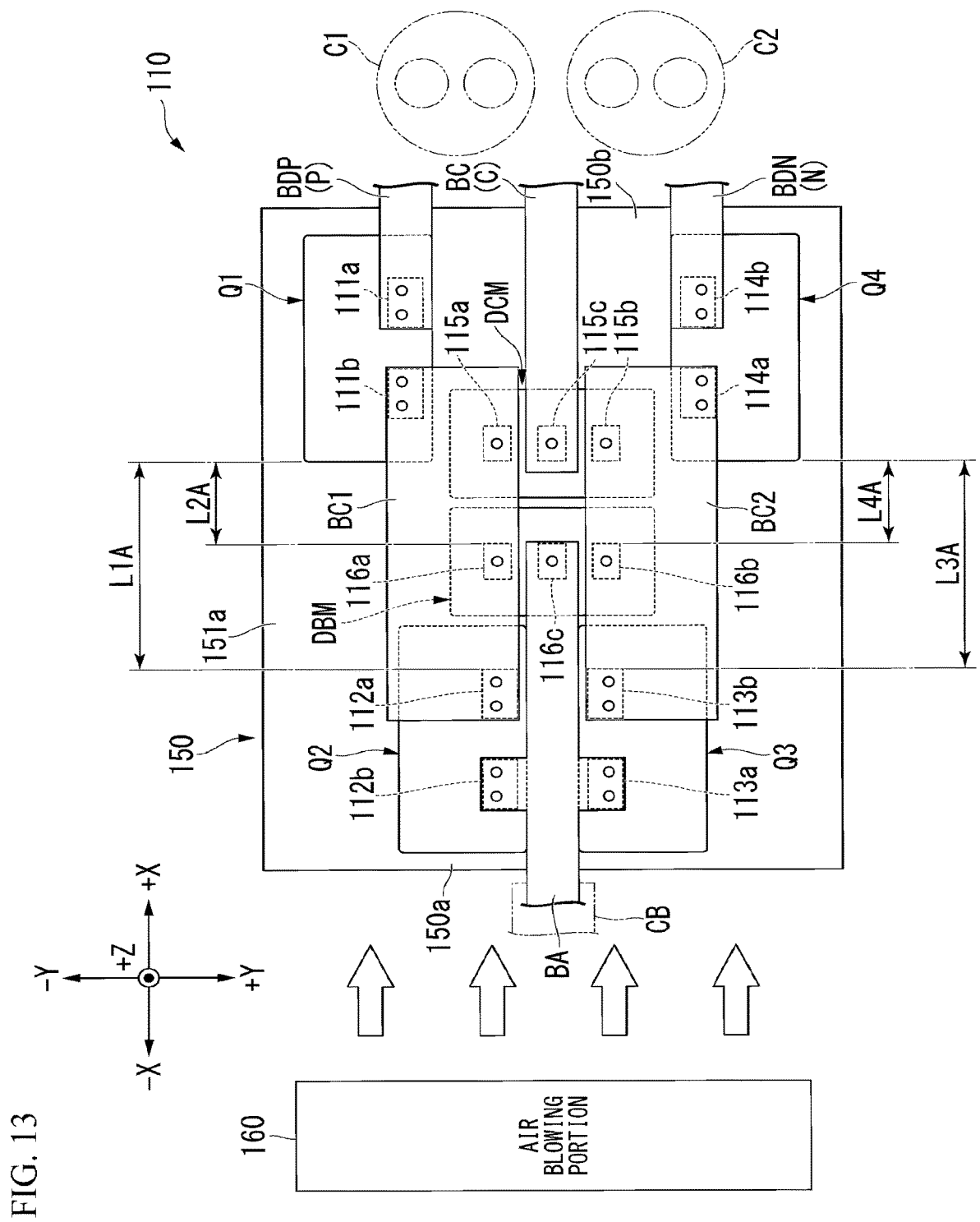
FIG. 13 is a plan view showing the physical constitution corresponding to one leg of the converter according to the second embodiment.

As shown in FIG. 13, a shortest distance L1A between the terminal 112a of the first inner element module Q2 and the terminal 115a of the clamp diode module DCM is longer than a shortest distance L2A between the terminal 116a of the shunt diode module DBM and the terminal 115a of the clamp diode module DCM. Similarly, a shortest distance L3A between the terminal 113b of the second inner element module Q3 and the terminal 115b of the clamp diode module DCM is longer than a shortest distance L4A between the terminal 116b of the shunt diode module DBM and the terminal 115b of the clamp diode module DCM.

Figure 14:
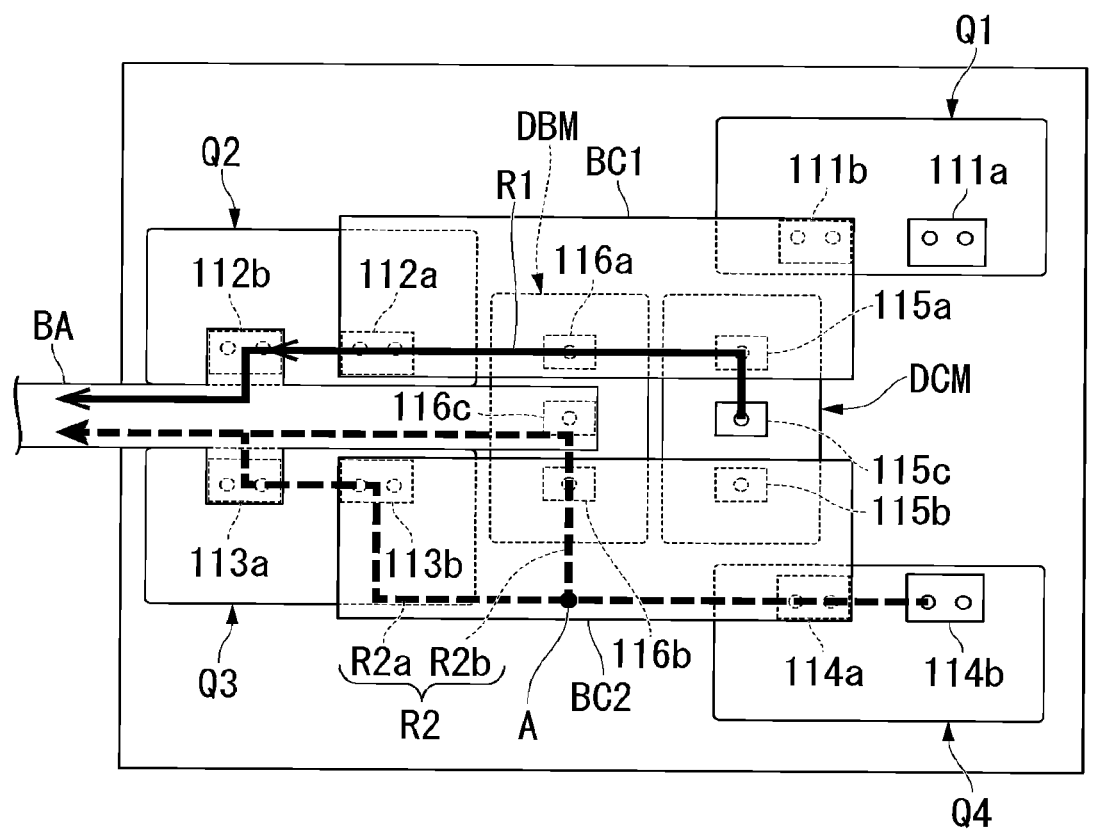
FIG. 14 is a diagram showing an example of a cutoff path and a free-wheeling path according to the second embodiment.

FIG. 14 is a diagram illustrating an example of the cutoff path R1 and the free-wheeling path R2 of the converter 100 of the embodiment. FIG. 14 shows the cutoff path R1 and the free-wheeling path R2 before and after the second switching element SW2 is turned off when the first clamp diode DC1 and the second switching element SW2 are energized. In the constitution of the embodiment, a length of the cutoff path R1 (for example, a length between the second switching element SW2 and the neutral point C) is longer than that in the constitution of the first embodiment.

According to such a constitution, as in the first embodiment, the heat generation can be distributed to the plurality of modules (the shunt diode module DBM and the first and second inner element modules Q2 and Q3). Therefore, the temperature rise in the first and second inner element modules Q2 and Q3 can be curbed. Moreover, according to the embodiment, as in the first embodiment, by forming a plurality of free-wheeling paths by shunting, the inductance of the free-wheeling path is reduced as compared with a case in which the shunt diode module DBM is not present. Thus, a surge voltage can be reduced.

However, according to the constitution of the embodiment, since the length of the cutoff path R1 is longer than that in the first embodiment, the surge voltage is increased as compared with that in the first embodiment. In other words, according to the constitution of the first embodiment, the length of the cutoff path R1 can be reduced as compared to the constitution of the embodiment, and the surge voltage can be reduced. Therefore, according to the converter 100 of the first embodiment, reduction in the loss can be more effectively achieved.

Third Embodiment

Next, a converter 100 and a drive device 1 of a third embodiment are described with reference to FIGS. 15 and 16. The third embodiment is different from the first embodiment in that the shunt diode module DBM is disposed at a position shifted in the +Y direction with respect to the first and second inner element modules Q2 and Q3. The constitution other than that described below is the same as that of the first embodiment.

Figure 15:
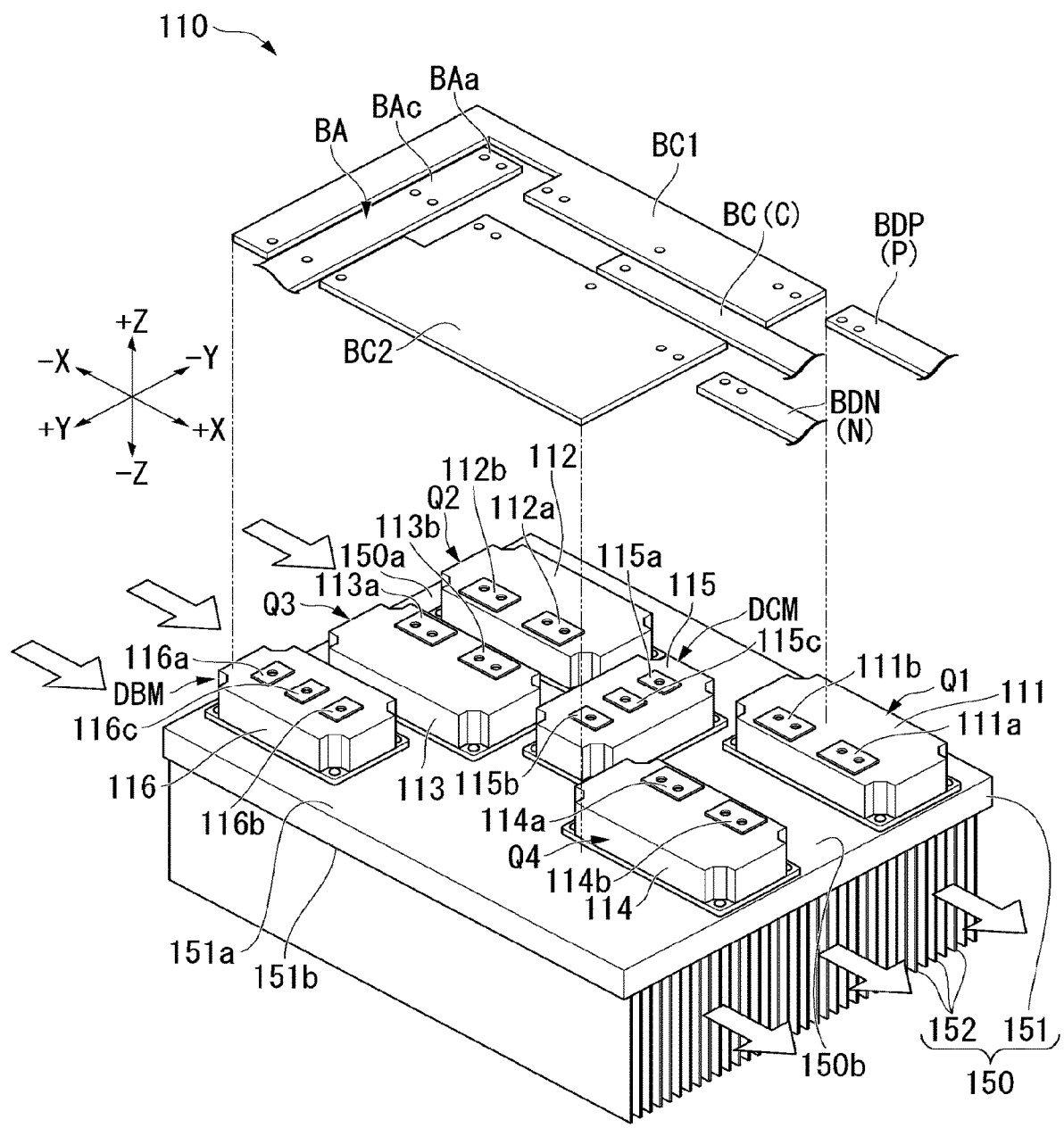
FIG. 15 is a perspective view showing a physical constitution corresponding to one leg of a converter according to a third embodiment.
Figure 16:
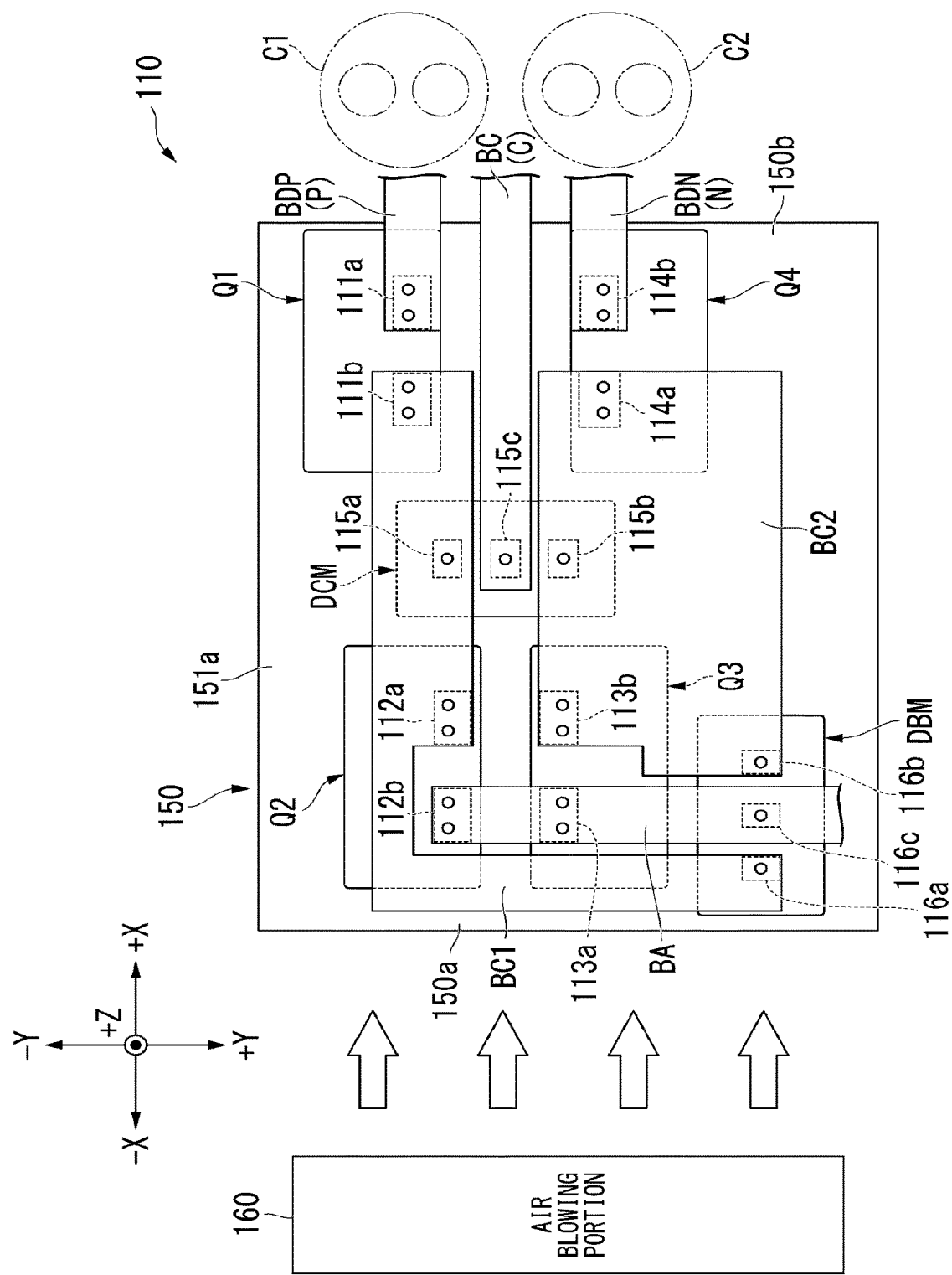
FIG. 16 is a plan view showing the physical constitution corresponding to one leg of the converter according to the third embodiment.

FIG. 15 is a perspective view showing a physical constitution corresponding to the first leg 110 of the converter 100 of the embodiment. FIG. 16 is a plan view showing the physical constitution. As shown in FIG. 15 and FIG. 16, in the embodiment, the shunt diode module DBM is not disposed on the −X direction side (that is, the windward side) of the two inner element modules Q2 and Q3. In the embodiment, the shunt diode module DBM is disposed on the +Y direction side with respect to the first and second inner element modules Q2 and Q3. That is, the shunt diode module DBM is disposed on the side of the second inner element module Q3 opposite to the first inner element module Q2. The shunt diode module DBM is formed in a rectangular parallelepiped shape having a longitudinal direction in a direction (the X direction) in which the three terminals 116a, 116b, and 116c are arranged. The three terminals 116a, 116b, and 116c are arranged in the +X direction in the order of the terminal 116a, the terminal 116c, and the terminal 116b.

In the embodiment, the terminal 116c of the shunt diode module DBM, the terminal 112b of the first inner element module Q2, and the terminal 113a of the third inner element module Q3 are arranged in the +Y direction in the order of the terminal 112b, the terminal 113a, and the terminal 116c. Accordingly, in the embodiment, the AC bus BA extends in the Y direction. The first connection bus BC1 is formed in an L shape. The second connection bus BC2 is formed in a relatively wide rectangular shape. Further, in the embodiment, the first and second outer element modules Q1 and Q4 are disposed on the +X direction side (that is, the leeward side) of the clamp diode module DCM.

According to such a constitution, as in the first embodiment, the heat generation can be distributed to the plurality of modules (the shunt diode module DBM and the first and second inner element modules Q2 and Q3). Thus, the temperature rise in the first and second inner element modules Q2 and Q3 can be curbed. Further, according to the embodiment, as in the first embodiment, since the plurality of free-wheeling paths are formed by the shunting, the inductance of the free-wheeling path is reduced as compared to the case where the shunt diode module DBM is not present. Therefore, the surge voltage can be reduced. Furthermore, in the embodiment, the shunt diode module DBM is not disposed on the windward side of the first and second inner element modules Q2 and Q3, the clamp diode module DCM, and the like. Thus, it is difficult for the aftereffect (such as an influence of the cooling air heated by the shunt diode module DBM in the cooling air passing through the gaps between the plurality of fins 152 of the heat sink 150) of the heat from the shunt diode module DBM to affect the other modules Q2 and Q3. Accordingly, the temperature rise in the first and second inner element modules Q2 and Q3 can be more effectively curbed.

Fourth Embodiment

Next, a converter 100B and a drive device 1B of a fourth embodiment are described with reference to FIG. 17. The fourth embodiment is different from the first embodiment in that a three-phase type converter 100B is provided. The constitution other than that described below is the same as that of the first embodiment.

Figure 17:
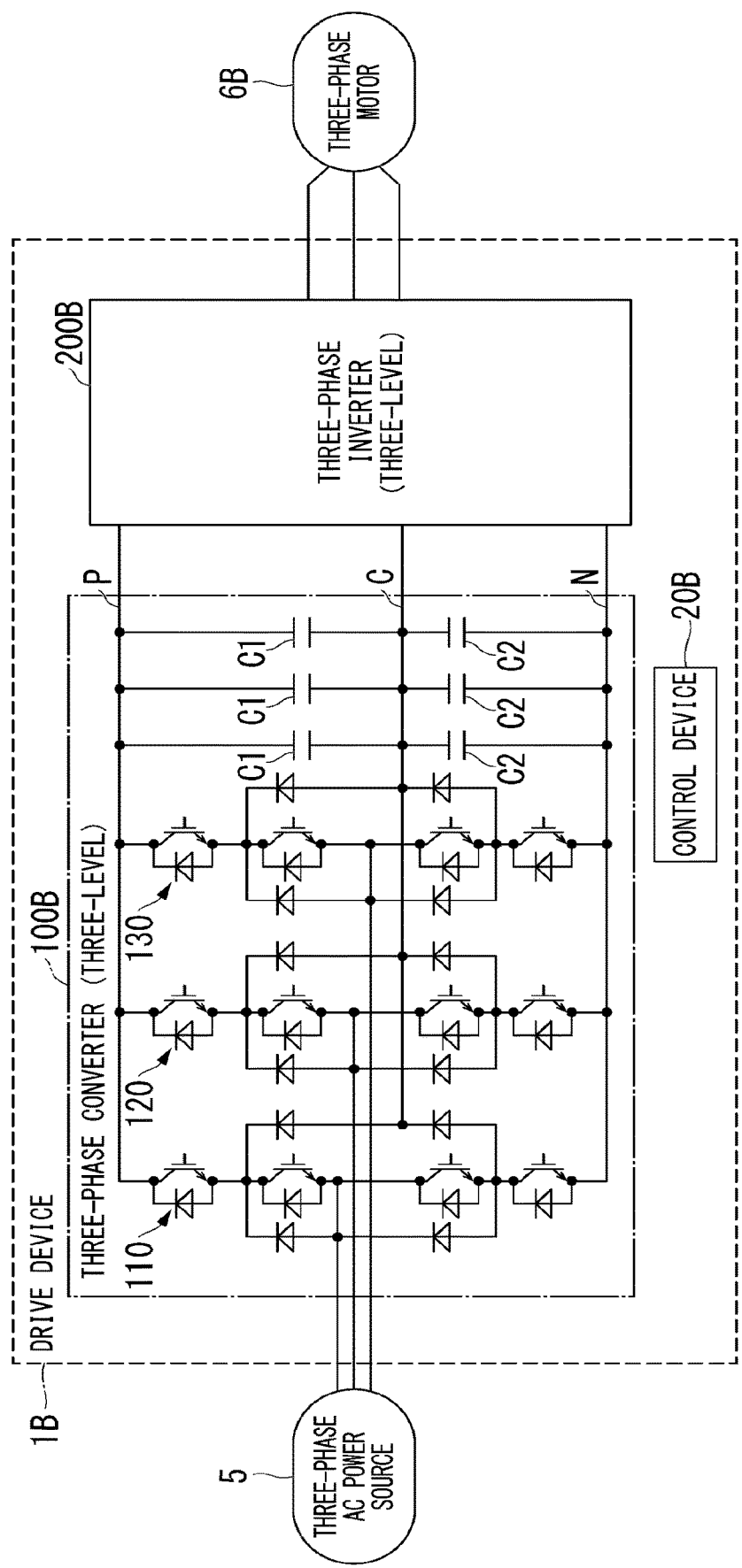
FIG. 17 is a diagram showing an example of a drive device according to a fourth embodiment.

FIG. 17 is a diagram showing an example of the drive device 1B according to the fourth embodiment. As shown in FIG. 17, the drive device 1B includes, for example, a three-phase three-level converter 100B, a three-phase three-level inverter 200B, and a control device 20B.

The three-level converter 100B (hereinafter, simply referred to as "converter 100B") is an NPC-type three-level converter and is an example of the "power conversion device." The converter 100B is electrically connected to the three-phase AC power source 5 and converts AC power supplied from the three-phase AC power source 5 into DC power. The converter 100B is a converter in which a switching element is controlled by PWM, for example. The converter 100B includes, for example, three legs (a first leg 110, a second leg 120, a third leg 130), at least one (for example, a plurality of) first capacitor C1, and at least one (for example, a plurality of) second capacitor C2. The constitution and function of the first to third legs 110, 120, and 130 are substantially the same as those of the first leg 110 described in the first embodiment.

The three-level inverter 200B (hereinafter, simply referred to as "inverter 200B") is electrically connected to, for example, a three-phase motor 6B. The three-phase motor 6B is an example of a "load." The inverter 200B converts the DC power converted and output by the converter 100B into AC power having an arbitrary frequency and voltage for controlling a torque and speed of the three-phase motor 6B. The inverter 200B supplies the converted AC power to the three-phase motor 6B. Thus, the three-phase motor 6B is driven.

The control device 20B controls the converter 100B and the inverter 200B. For example, the control device 20B controls the converter 100B by transmitting a control signal to a switching element included in the converter 100B based on information indicating a phase voltage of the three-phase AC power source 5 detected by a voltage detector (not shown).

Also with such a constitution, as in the first embodiment, the heat generation can be distributed to a plurality of modules (the shunt diode module DBM and the first and second inner element modules Q2 and Q3). Therefore, the temperature rise in the first and second inner element module Q2, Q3 can be curbed. Also in the constitution of the embodiment, the surge voltage can be reduced as in the first embodiment. Further, as the constitution of the first to third legs 110, 120, and 130 of the embodiment, the constitution described in the second and third embodiments may be employed instead of that described in the first embodiment.

Fifth Embodiment

Next, a converter 100 and a drive device 1 of a fifth embodiment are described with reference to FIG. 18. The fifth embodiment is different from the first embodiment in that the shunt diodes DB1 and DB2 are built in the inner element modules Q2 and Q3. The constitution other than that described below is the same as that of the first embodiment.

Figure 18:
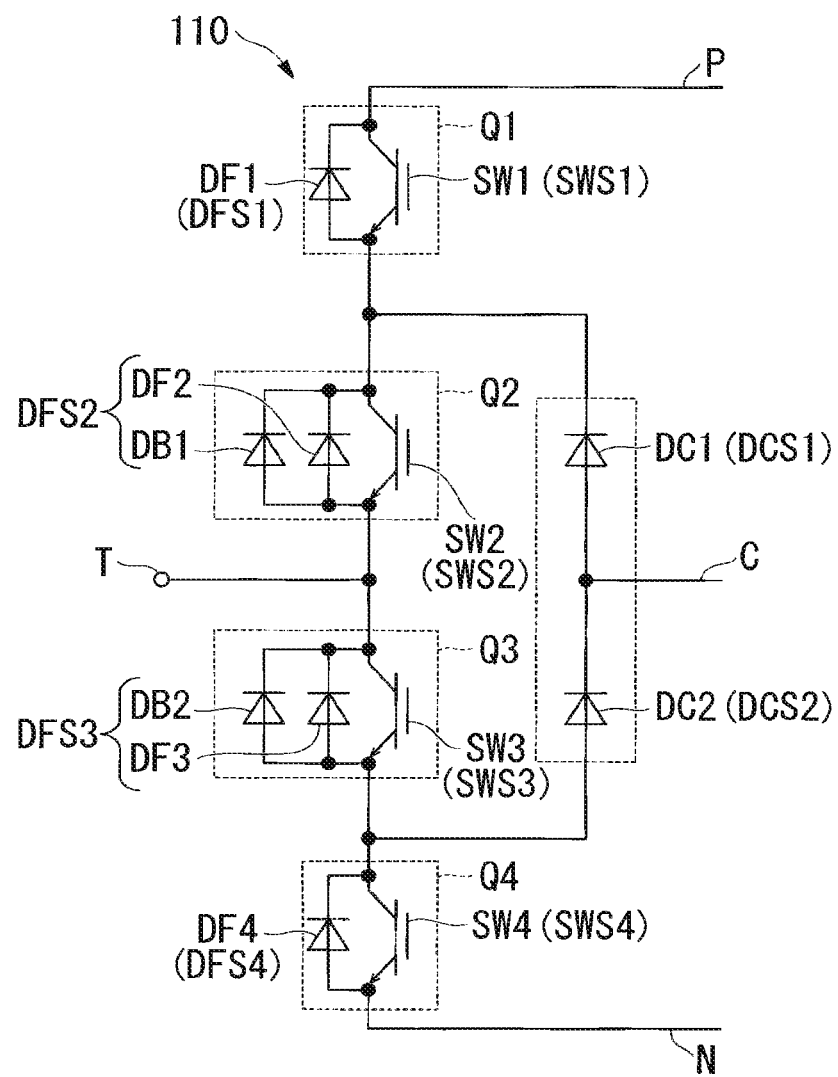
FIG. 18 is a diagram showing a first leg of a fifth embodiment.

FIG. 18 is a diagram showing the first leg 110 of the converter 100. As shown in FIG. 18, in the embodiment, a first switching portion SWS1 is constituted of one first switching element SW1. Similarly, a second switching portion SWS2 is constituted of one second switching element SW2. A third switching portion SWS3 is constituted of one third switching element SW3. A fourth switching portion SWS4 is constituted of one fourth switching element SW4.

Further, a first diode portion DFS1 is constituted of one first free-wheeling diode DF1. A fourth diode portion DFS4 is constituted of one fourth free-wheeling diode DF4. A fifth diode portion DCS1 is constituted of one first clamp diode DC1. A sixth diode portion DCS2 is constituted of one second clamp diode DC2.

Additionally, in the embodiment, a second diode portion DFS2 is constituted of the second free-wheeling diode DF2 and the first shunt diode DB1. The second diode portion DFS2 is a group of a plurality of diodes electrically connected in inverse parallel to the second switching portion SWS2. The first shunt diode DB1 is built in the first inner element module Q2 (that is, accommodated in the package 112) together with the second free-wheeling diode DF2 and the second switching element SW2.

In the embodiment, a current capacity of the second diode portion DFS2 is larger than that of the second switching portion SWS2. The current capacity of the second diode portion DFS2 is a total value of a current capacity of the second free-wheeling diode DF2 and a current capacity of the first shunt diode DB1. In the embodiment, the second switching portion SWS2 is constituted of one or more switching elements (for example, the second switching elements SW2). The second diode portion DFS2 is constituted of two or more diodes (the second free-wheeling diode DF2 and the first shunt diode DB1). Additionally, the number of the two or more diodes constituting the second diode portion DFS2 is greater than the number of the one or more switching elements constituting the second switching portion SWS2.

Similarly, the third diode portion DFS3 is constituted of the third free-wheeling diode DF3 and the second shunt diode DB2. The third diode portion DFS3 is a group of a plurality of diodes electrically connected in inverse parallel to the third switching element SW3. The second shunt diode DB2 is built in the second inner element module Q3 (that is, accommodated in the package 113) together with the third free-wheeling diode DF3 and the third switching element SW3.

In the embodiment, a current capacity of the third diode portion DFS3 is larger than that of the third switching portion SWS3. The current capacity of the third diode portion DFS3 is a total value of a current capacity of the third free-wheeling diode DF3 and a current capacity of the second shunt diode DB2. In the embodiment, the third switching portion SWS3 is constituted of one or more switching elements (for example, the third switching elements SW3). The third diode portion DFS3 is constituted of two or more diodes (the third free-wheeling diode DF3 and the second shunt diode DB2). Additionally, the number of the two or more diodes constituting the third diode portion DFS3 is greater than the number of the one or more switching elements constituting the third switching portion SWS3.

Also with such a constitution, the temperature rise in the first and second inner element modules Q2 and Q3 of the converter 100 can be curbed. For example, in the embodiment, the current capacity of the second diode portion DFS2 is larger than that of the second switching portion SWS2. According to such a constitution, since heat is distributed in the second diode portion DFS2 having a large current capacity, it is possible to curb the temperature rise in the first inner element module Q2. This is the same when the current capacity of the third diode portion DFS3 is larger than that of the third switching portion SWS3.

In the embodiment, the number of diodes constituting the second diode portion DFS2 is larger than the number of switching elements constituting the second switching portion SWS2. According to such a constitution, it is possible to distribute heat generation points to a plurality of diodes which are larger than the number of switching elements. Therefore, since the heat is distributed in the first inner element module Q2, the temperature rise in the first inner element module Q2 can be more effectively curbed. This is the same even when the number of diodes constituting the third diode portion DFS3 is larger than the number of switching elements constituting the third switching portion SWS3.

The second leg 120 of the converter 100 (or the first to third legs 110, 120, and 130 of the converter 100B) may have the same constitution as that described above.

Although the converters 100 and 100B and the drive devices 1 and 1B according to some embodiments and modified examples have been described above, the embodiments are not limited to the above-described examples. For example, the first outer element module Q1 and the first inner element module Q2 do not need to be separated into separate packages. For example, the first and second switching elements SW1 and SW2 and the first and second free-wheeling diodes DF1 and DF2 may be built in one package. The same is applied to the second outer element module Q4 and the second inner element module Q3. Further, the first inner element module Q2 and the second inner element module Q3 do not need to be separated into separate packages and may be provided as one package. Furthermore, the first and second outer element modules Q1 and Q4 and the first and second inner element modules Q2 and Q3 do not need to be separated into separate packages and may be provided as one package.

Figure 19:
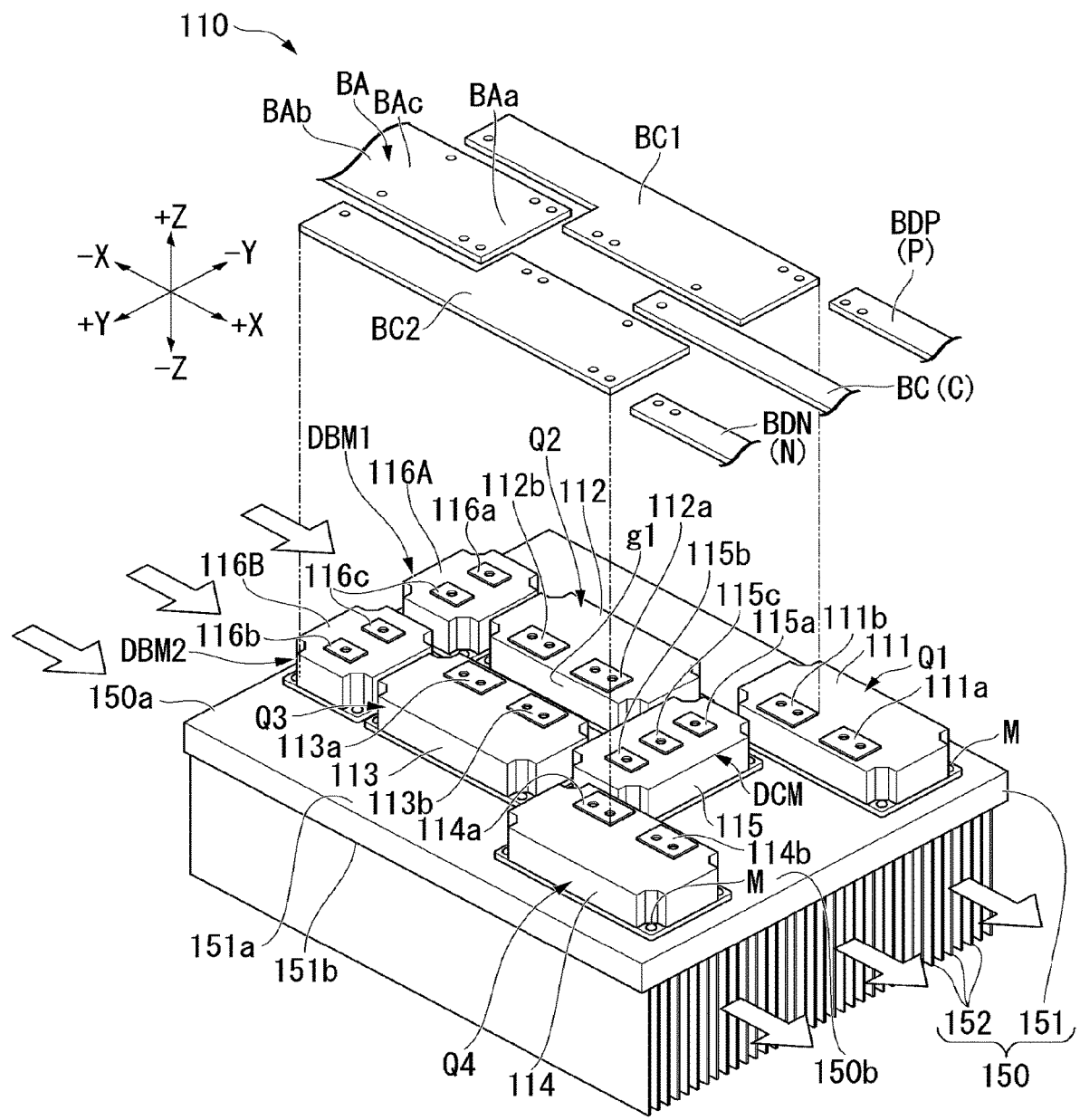
FIG. 19 is a perspective view showing a physical constitution corresponding to one leg of a converter according to a modified example of the embodiment.

Further, the first shunt diode DB1 and the second shunt diode DB2 do not need to be accommodated in one package 116. The first shunt diode DB1 and the second shunt diode DB2 may be accommodated in separate packages. FIG. 19 is a perspective view showing a physical constitution corresponding to one leg of the converter according to a modified example according to the embodiment. As shown in FIG. 19, the first shunt diode DB1 may be built in the first shunt diode module DBM1 and may be accommodated in a package 116A of the first shunt diode module DBM1. The second shunt diode DB2 may be built in the second shunt diode module DBM2 and may be accommodated in a package 116B of the second shunt diode module DBM2. This modified example is applicable to all the above-described embodiments.

Further, the shunt diode module DBM and the other modules Q1, Q2, Q3, Q4, and DCM do not need to be mounted on one heat sink 150 and may be separately mounted on a plurality of different heat sinks. Furthermore, the cooling method of the heat sink 150 is not limited to the air cooling method and may be a water cooling method.

Further, the converters 100 and 100B may have a function as an inverter which converts DC power to AC power when regenerative power is generated, for example.

Further, the converters 100 and 100B may be combined with a DC load other than the inverter instead of the inverters 200 and 200B. The "DC load" broadly means devices which function with DC power. The DC load is, for example, a DC motor, an electromagnet, a heater, or the like but is not limited thereto.

According to at least one embodiment described above, the shunt diode electrically connected in parallel to the free-wheeling diode is provided, the free-wheeling diode is accommodated in a first package, and the shunt diode is accommodated in a second package which is different from the first package and does not include the switching elements. According to such a constitution, it is possible to curb the temperature rise in the semiconductor module.

Although some embodiments of the present invention have been described, the embodiments are presented by way of example and are not intended to limit the scope of the invention. The embodiments can be implemented in various other forms, and various omissions, replacements, and changes can be made without departing from the spirit of the invention. The embodiments and their modified examples are included in the scope and gist of the invention and are also included in the invention described in the claims and the equivalents thereof.

REFERENCE SIGNS LIST

1, 1B Drive device
100, 100B Converter
SW1 First switching element
SW2 Second switching element
SW3 Third switching element
SW4 Fourth switching element
DF1 First free-wheeling diode (first diode)
DF2 Second free-wheeling diode (second diode)
DF3 Third free-wheeling diode (third diode)
DF4 Fourth free-wheeling diode (fourth diode)
DC1 First clamp diode (fifth diode)
DC2 Second clamp diode (sixth diode)
DB1 First shunt diode (seventh diode)
DB2 Second shunt diode (eighth diode)
Q1 First outer element module
Q2 First inner element module
Q3 Second inner element module
Q4 Second outer element module
DCM Clamp diode module
DBM Shunt diode module
112 Package of first inner element module (first package)
112a Terminal (first terminal)
115 Package of clamp diode module (third package)
115a Terminal (third terminal)
116 Package of shunt diode module (second package)
116a Terminal (second terminal)
150 Heat sink
P Positive electrode
N Negative electrode
C Neutral point
T1, T2, T AC terminal
CP1 Connection portion (first connection portion)
CP2 Connection portion (second connection portion)
CP3 Connection portion (third connection portion)
CP4 Connection portion (fourth connection portion)

The invention claimed is:

1. A power conversion device of neutral point clamp type comprising:
first to fourth switching elements which are electrically connected to each other in series in an order of the first switching element, the second switching element, the third switching element, and the fourth switching element from a positive electrode toward a negative electrode;
first to fourth diodes which are electrically connected in inverse parallel to the first to fourth switching elements, respectively;
a fifth diode whose cathode is electrically connected to a first connection portion which electrically connects the first switching element to the second switching element and whose anode is electrically connected to a neutral point of the power conversion device;
a sixth diode whose anode is electrically connected to a second connection portion which electrically connects the third switching element to the fourth switching element and whose cathode is electrically connected to the neutral point;
a seventh diode which is electrically connected in parallel to the second diode; and
an eighth diode which is electrically connected in parallel to the third diode,
wherein the second diode is accommodated in a first package,
the seventh diode is accommodated in a second package which is different from the first package and does not include the first to fourth switching elements, and
the eighth diode is accommodated in the second package, or the eighth diode is accommodated in another package which is different from the first package and the second package and does not include the first to fourth switching elements,
the power conversion device further comprising:
an AC terminal to which AC power is supplied from an outside of the power conversion device; and
a first conductor which extends from the first package to a first side toward the AC terminal or a conductor electrically connected to the AC terminal,
wherein the second package is disposed on the first side with respect to the first package.

2. The power conversion device according to claim 1, wherein the second switching element is accommodated in the first package.

3. The power conversion device according to claim 1, wherein the eighth diode is accommodated in the second package.

4. The power conversion device according to claim 1, wherein
the fifth diode is accommodated in a third package, and the second package is disposed on a side opposite to the third package with respect to at least a part of the first package.

5. A power conversion device of neutral point clamp type comprising:
- first to fourth switching elements which are electrically connected to each other in series in an order of the first switching element, the second switching element, the third switching element, and the fourth switching element from a positive electrode toward a negative electrode;
- first to fourth diodes which are electrically connected in inverse parallel to the first to fourth switching elements, respectively;
- a fifth diode whose cathode is electrically connected to a first connection portion which electrically connects the first switching element to the second switching element and whose anode is electrically connected to a neutral point of the power conversion device;
- a sixth diode whose anode is electrically connected to a second connection portion which electrically connects the third switching element to the fourth switching element and whose cathode is electrically connected to the neutral point;
- a seventh diode which is electrically connected in parallel to the second diode; and
- an eighth diode which is electrically connected in parallel to the third diode,
- wherein the second diode is accommodated in a first package,
- the seventh diode is accommodated in a second package which is different from the first package and does not include the first to fourth switching elements, and
- the eighth diode is accommodated in the second package, or the eighth diode is accommodated in another package which is different from the first package and the second package and does not include the first to fourth switching elements,
- the power conversion device further comprising a second conductor which electrically connects the second diode, the fifth diode, and the seventh diode,
- wherein the first package has a first terminal which is connected to the second conductor,
- the second package has a second terminal which is connected to the second conductor,
- the fifth diode is accommodated in a third package which has a third terminal connected to the second conductor; and
- a shortest distance between the first terminal and the third terminal is shorter than a shortest distance between the second terminal and the third terminal.

6. The power conversion device according to claim 1, further comprising a heat sink which has a first end portion disposed on a windward side and a second end portion disposed on a leeward side and on which the first package and the second package are mounted,
- wherein the second package is disposed between the first package and the first end portion of the heat sink.

7. The power conversion device according to claim 1, further comprising an AC terminal which is electrically connected to a third connection portion which electrically connects the second switching element to the third switching element and a fourth connection portion which electrically connects the seventh diode to the eighth diode and to which AC power is supplied from an outside of the power conversion device,
- wherein a wiring length between the AC terminal and the seventh diode is shorter than that between the AC terminal and the second diode, and
- a wiring length between the AC terminal and the eighth diode is shorter than that between the AC terminal and the third diode.

8. The power conversion device according to claim 1, wherein
- the second diode and the seventh diode have substantially the same characteristics related to a forward voltage drop, and
- the third diode and the eighth diode have substantially the same characteristics related to the forward voltage drop.

9. A power conversion device of neutral point clamp type comprising:
- first to fourth switching elements which are electrically connected to each other in series in an order of the first switching element, the second switching element, the third switching element, and the fourth switching element from a positive electrode toward a negative electrode;
- first to fourth diodes which are electrically connected in inverse parallel to the first to fourth switching elements, respectively;
- a fifth diode whose cathode is electrically connected to a first connection portion which electrically connects the first switching element to the second switching element and whose anode is electrically connected to a neutral point of the power conversion device;
- a sixth diode whose anode is electrically connected to a second connection portion which electrically connects the third switching element to the fourth switching element and whose cathode is electrically connected to the neutral point;
- a seventh diode which is electrically connected in parallel to the second diode;
- an eighth diode which is electrically connected in parallel to the third diode; and
- an AC terminal which is electrically connected to a third connection portion which electrically connects the second switching element to the third switching element and a fourth connection portion which electrically connects the seventh diode to the eighth diode and to which AC power is supplied from an outside of the power conversion device,
- wherein the seventh diode is disposed farther from the second switching element than the second diode,
- a wiring length between the AC terminal and the seventh diode is shorter than that between the AC terminal and the second diode,
- the eighth diode is disposed farther from the third switching element than the third diode, and
- a wiring length between the AC terminal and the eighth diode is shorter than that between the AC terminal and the third diode.

* * * * *